(12) United States Patent
Asano et al.

(10) Patent No.: US 11,857,941 B2
(45) Date of Patent: Jan. 2, 2024

(54) MICROREACTOR SYSTEM

(71) Applicant: HITACHI PLANT SERVICES CO., LTD., Tokyo (JP)

(72) Inventors: Yukako Asano, Tokyo (JP); Masashi Tagami, Tokyo (JP); Hiroaki Kato, Tokyo (JP)

(73) Assignee: HITACHI PLANT SERVICES CO., LTD., Tokyo (JP)

( * ) Notice: Subject to any disclaimer, the term of this patent is extended or adjusted under 35 U.S.C. 154(b) by 0 days.

(21) Appl. No.: 17/799,725

(22) PCT Filed: Jan. 25, 2021

(86) PCT No.: PCT/JP2021/002504
§ 371 (c)(1),
(2) Date: Aug. 15, 2022

(87) PCT Pub. No.: WO2021/192573
PCT Pub. Date: Sep. 30, 2021

(65) Prior Publication Data
US 2023/0082190 A1  Mar. 16, 2023

(30) Foreign Application Priority Data
Mar. 24, 2020 (JP) ................................ 2020-052513

(51) Int. Cl.
*B01J 19/00* (2006.01)

(52) U.S. Cl.
CPC .. *B01J 19/0093* (2013.01); *B01J 2219/00867* (2013.01); *B01J 2219/00889* (2013.01);
(Continued)

(58) Field of Classification Search
CPC ........ B01J 19/00; B01J 19/0093; B01J 19/24; B01J 2219/00; B01J 2219/00781;
(Continued)

(56) References Cited

U.S. PATENT DOCUMENTS 10,464,039 B2 * 11/2019 Asano ................... B01J 19/0093
10,987,649 B2 * 4/2021 Asano ...................... B01J 19/00
(Continued)

FOREIGN PATENT DOCUMENTS

JP       05-084864 U    11/1993
JP       2011-025148 A   2/2011
(Continued)

OTHER PUBLICATIONS

International Search Report of PCT/JP2021/002504 dated Mar. 9, 2021.

*Primary Examiner* — Natasha E Young
(74) *Attorney, Agent, or Firm* — Mattingly & Malur, PC

(57) ABSTRACT

A microreactor system includes: a microreactor that has two inflow ports into which fluids are introduced and a flow path configured to merge the fluids, and that is configured to mix a first fluid introduced from one of the inflow ports and a second fluid introduced from the other of the inflow ports in the flow path; a first container in which the first fluid is prepared; a second container in which the second fluid is prepared; a first pump configured to feed the first fluid toward the inflow port; a second pump configured to feed the second fluid toward the inflow port; first and second measurement units configured to measure amounts of the first fluid and the second fluid, respectively; and switching units configured to switch at least one of the first fluid and the second fluid to be fed to the microreactor.

13 Claims, 14 Drawing Sheets

(52) U.S. Cl.
CPC ............... *B01J 2219/00891* (2013.01); *B01J 2219/00954* (2013.01)

(58) Field of Classification Search
CPC .... B01J 2219/00783; B01J 2219/00788; B01J 2219/00792; B01J 2219/00819; B01J 2219/00833; B01J 2219/00851; B01J 2219/00867; B01J 2219/00889; B01J 2219/00891; B01J 2219/0095; B01J 2219/00952; B01J 2219/00954; B01J 2219/00959; B01J 2219/18; B01J 2219/185; B01J 2219/19; B01J 2219/192; B01J 2219/1923
See application file for complete search history.

(56) References Cited

U.S. PATENT DOCUMENTS

| | | | |
|---|---|---|---|
| 2011/0046243 A1* | 2/2011 | Ito | ............................ B01F 23/41 516/98 |
| 2020/0282376 A1 | 9/2020 | Asano et al. | |

FOREIGN PATENT DOCUMENTS

| | | | | |
|---|---|---|---|---|
| JP | 2011-212549 A | 10/2011 | | |
| JP | 2019-042713 A | 3/2019 | | |
| JP | 2020-012663 A | 1/2020 | | |
| WO | 2006/043642 A1 | 4/2006 | | |
| WO | WO-2017179353 A1 * | 10/2017 | .............. | B01J 19/00 |
| WO | WO-2019049547 A1 * | 3/2019 | .............. | B01F 15/02 |

* cited by examiner

MICROREACTOR SYSTEM

This application is a national stage application claiming priority to PCT/JP2021/002504, now WO2021/192573, filed on Jan. 25, 2021, which claims priority to Japan Patent Application Serial No. JP2020-052513, filed on Mar. 24, 2020.

BACKGROUND OF THE INVENTION

1. Field of the Invention

The present invention relates to a microreactor system including a microreactor that mixes fluids.

2. Description of the Related Art

In recent years, the use of microreactors has been promoted in bio-related fields, and fields of production of medicines, chemical products, and the like. The microreactor is a flow-type reactor including a minute flow path on the order of µm, and is used for mixing and reaction of fluids. In general, microreactors are manufactured using micromachining techniques such as molding and lithography, and replaceable and detachable microreactors and single-use microreactors assumed to be disposable are also studied.

Since the microreactor uses a minute flow path as a reaction field, mixing of fluids due to molecular diffusion can be rapidly performed. In addition, since the effect of a surface area with respect to a volume of a fluid is increased as compared with a batch method using a related-art large reactor, there is a characteristic that the efficiency of heat transfer, heat conduction, chemical reaction, and the like is increased. Due to such a characteristic, application of the microreactor is expected to shorten a reaction time and improve a reaction yield in various fields.

Since the microreactor provides a small reaction field of a closed system, the microreactor is suitable for handling corrosive substances, reactive substances, other hazardous substances, and reactions accompanying with a risk. In addition, since an occupied volume is small, the degree of freedom in numbering up is high, and mass production of substances can be implemented by simplifying chemical engineering studies. Therefore, it is expected that the movement of applying the microreactor to a wide range of fields will be further accelerated.

In general, the microreactor is configured as a system together with a pump, a pipe, a temperature control device, and the like, and is used with various operations semi-automated. In the field of production of medicines and the like, it is required to cope with good manufacturing practice (GMP: criteria related to production management and quality management of medicines). Therefore, the microreactor system is also required to comply with regulations.

Specifically, not only the design, assembly, maintenance, and the like of the microreactor itself, but also the entire liquid contact portion such as the pipe and the like are required to have performance that guarantees sterility and non-eluting properties and causes no deterioration and contamination of raw materials and intermediates. In addition, reproducibility of a process is required, and it is necessary to cope with validation of control software and troubleshooting such as a countermeasure against leakage.

In the related art, feeding (liquid feeding) of a fluid in the microreactor system has been studied.

For example, JP-A-2019-042713 describes a microreactor system including a microreactor, a pump, a fluid detector, and the like. In the microreactor system, each fluid is fed toward the microreactor, and each fluid is introduced into the microreactor after a conduit to the microreactor is filled with the fluid. By such liquid feeding, the timing at which each fluid reaches a junction in the microreactor is controlled.

WO 2006/043642 describes a liquid reaction device provided with a flow path selection switching valve as an example of a microreactor system (see claim 45 and the like). The flow path selection switching valve is switched after temperatures of a mixing substrate and a reaction substrate are adjusted and a flow path is cleaned. By switching the flow path selection switching valve, a processing flow path from a raw material storage container to a recovery container via a pump, the mixing substrate, the reaction substrate, an outflow port, and a recovery port is implemented.

In the related art, in a general microreactor system, a fluid prepared in a container such as a tank is introduced into a microreactor through a pipe such as a tube. In general, the container in which a fluid is prepared has a structure in which a pipe is inserted from above. The fluid prepared in the container is suctioned upward by a pipe inserted from an upper portion of the container when the fluid is fed to the microreactor.

Such a related liquid feeding method has a drawback that the fluid remains in the container when the operation of the microreactor is completed. It is not easy to completely suction the fluid remaining in the vicinity of a bottom portion of the container, and it is also required not to suction the gas in the container. Therefore, when the operation of the microreactor is completed, a certain amount of fluid is usually left in the container.

Usually, the fluid remaining in the container is discarded without being reused because of concerns about contamination or deterioration. Therefore, in the case of the liquid feeding method in which the fluid is likely to remain in the container, waste of the fluid increases. The more expensive and rarer a fluid of a raw material to be mixed and reacted in the microreactor, the worse the cost efficiency and production efficiency. In addition, when the fluid of a raw material is a toxic substance or a hazardous substance, a risk due to contact at the time of disposal and costs of post-treatment are increased.

In the microreactor, mixing in which a mixing ratio is biased to one of fluids may be performed. When such mixing is performed, fluids to be fed are controlled to have different flow rates. For the fluid having a low flow rate, the amount of the fluid to be prepared in the container can be relatively reduced based on relation with the mixing ratio. However, actually, it is required to prepare an extra amount so as not to suction the air in the container. Therefore, it can be said that the lower the flow rate of the fluid to be sent, the more likely it is that the waste of the fluid increases.

The related-art liquid feeding method has a drawback that the fluid being fed remains in the microreactor or the pipe when the operation of the microreactor is completed. Usually, the microreactor and the pipe are provided with a sufficient internal volume with respect to a reaction time and a mixing time of the fluid. For example, when the reaction time is 30 minutes, the internal volume corresponding to a flow rate for 30 minutes is ensured downstream. In addition, there is a minimum requirement for the flow rate from the viewpoint of ensuring productivity.

Usually, the fluid remaining in the microreactor or the pipe is discarded without being reused because of concerns about contamination or deterioration. Therefore, if the fluid remains in the microreactor or the pipe, the waste of the fluid increases as in the case of the container. It is not realistic to remove and discard the microreactor or the pipe in which a large amount of fluid remains from the viewpoint of safety of work. If the fluid remains in the microreactor or the pipe, the cost efficiency and the production efficiency deteriorate, and the risk due to contact at the time of disposal and the costs of post-treatment increase.

SUMMARY OF THE INVENTION

Therefore, an object of the invention is to provide a microreactor system capable of efficiently utilizing a fluid of a raw material.

In order to solve the problems described above, a microreactor system according to the invention includes: a microreactor that has two inflow ports into which fluids are introduced and a flow path configured to merge the fluids, and that is configured to mix a first fluid introduced from one of the inflow ports and a second fluid introduced from the other of the inflow ports in the flow path; a first container in which the first fluid is prepared; a second container in which the second fluid is prepared; a first pump configured to feed the first fluid toward the inflow port; a second pump configured to feed the second fluid toward the inflow port; a first measurement unit configured to measure an amount of the first fluid in the first container; a second measurement unit configured to measure an amount of the second fluid in the second container; and a switching unit configured to switch at least one of the first fluid and the second fluid to be fed to the microreactor to a fluid different from the first fluid and the second fluid.

The microreactor system according to the invention can efficiently use a fluid of a raw material.

Other problems, configurations, and effects will be further clarified based on the following description of embodiments.

DESCRIPTION OF THE PREFERRED EMBODIMENTS

First Embodiment

Figure 1:
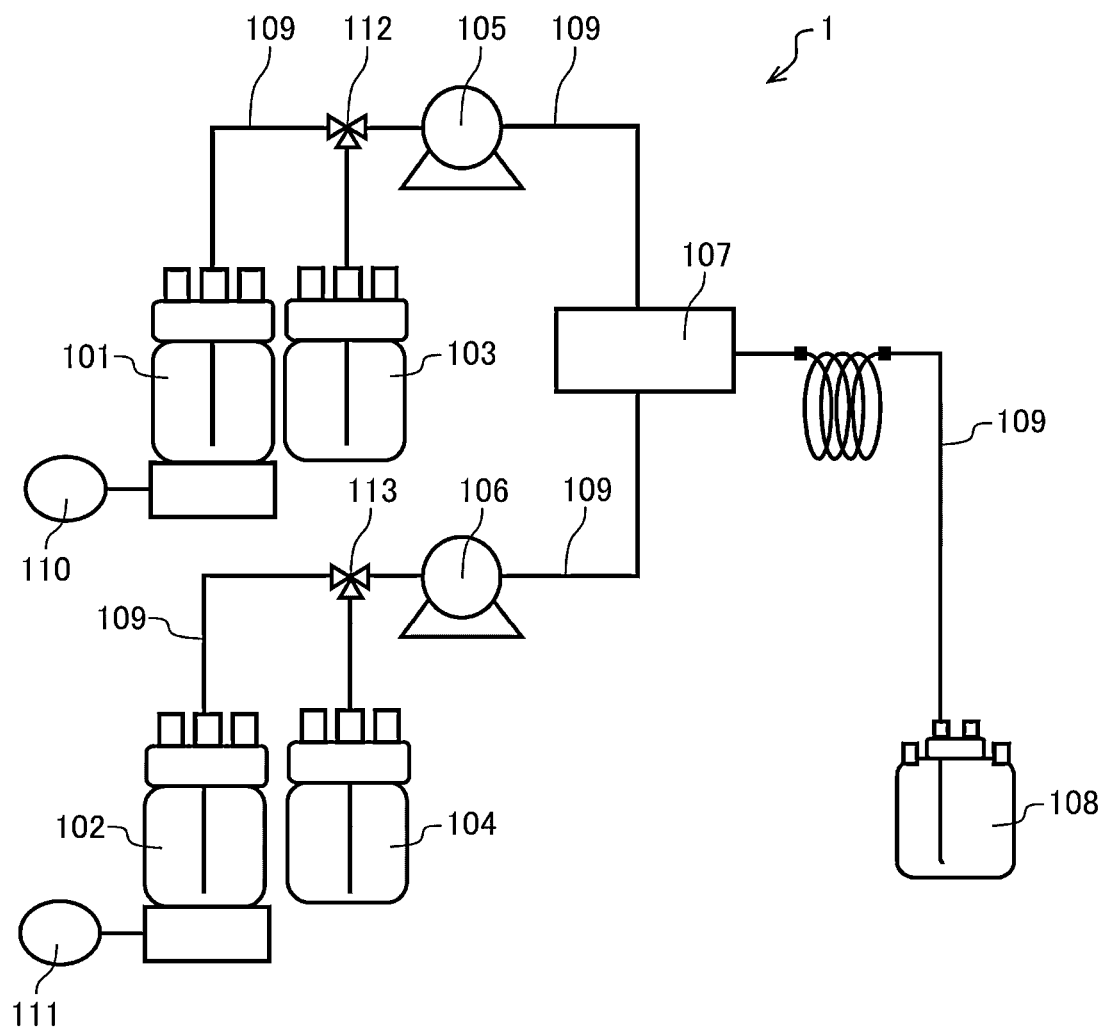
FIG. 1 is a schematic diagram of a microreactor system according to a first embodiment.

First, a microreactor system according to a first embodiment of the invention will be described with reference to the drawings. The same reference numerals are given to the same configurations in the following drawings, and repetitive description thereof will be omitted.

FIG. 1 is a schematic diagram of the microreactor system according to the first embodiment.

As shown in FIG. 1, a microreactor system 1 according to the first embodiment includes a first fluid container (a first container) 101, a second fluid container (a second container) 102, a third fluid container (a third container) 103, a fourth fluid container (a fourth container) 104, a first fluid pump (a first pump) 105, a second fluid pump (a second pump) 106, a microreactor 107, a collection container 108, a tube 109, a first fluid sensor (a first measurement unit) 110, a second fluid sensor (a second measurement unit) 111, a first switch (a first switching unit) 112, and a second switch (a second switching unit) 113.

The microreactor system 1 mixes fluids in the microreactor 107 to produce a mixture in which the fluids are mixed with each other or a reaction product (a mixed fluid) generated by a reaction between the fluids. The microreactor 107 is a flow-type reactor, and has two inflow ports into which individual fluids are introduced, a minute flow path through which the fluids are merged and mixed, and an outflow port through which the merged mixed fluid flows out.

In the microreactor system 1, while fluids of raw materials prepared in the fluid containers 101 and 102 are fed toward the microreactor 107 by the fluid pumps 105 and 106, amounts of the fluids remaining in the fluid containers 101 and 102 are measured by the fluid sensors 110 and 111. Then, when it is measured that there is no fluid in the fluid containers 101 and 102, the fluid or the fluid and the other fluid are switched to another fluid, which is fed toward the microreactor 107.

In the following description, a case will be exemplified in which a first liquid fluid and a second liquid fluid are used as the fluids of raw materials to be mixed and reacted in the microreactor 107.

As shown in FIG. 1, the first fluid container 101 and the first fluid pump 105 are connected to one of the inflow ports of the microreactor 107 via the tube 109. The first fluid container 101 is connected to the first fluid pump 105. The first fluid pump 105 is connected to the one of the inflow ports of the microreactor 107.

The first fluid container 101 is a container in which the first fluid is prepared. The first fluid pump 105 is a pump that feeds the first fluid toward the one of the inflow ports of the microreactor 107. When the first fluid is switched to another fluid, the first fluid pump 105 feeds the fluid toward the microreactor 107.

The second fluid container 102 and the second fluid pump 106 are connected to the other of the inflow ports of the microreactor 107 via the tube 109. The second fluid container 102 is connected to the second fluid pump 106. The second fluid pump 106 is connected to the other of the inflow ports of the microreactor 107.

The second fluid container 102 is a container in which the second fluid is prepared. The second fluid pump 106 is a pump that feeds the second fluid toward the other of the inflow ports of the microreactor 107. When the second fluid is switched to another fluid, the second fluid pump 106 feeds the fluid toward the microreactor 107.

The collection container 108 is connected to the outflow port of the microreactor 107 via the tube 109. The collection container 108 is a container that collects a mixture in which fluids are mixed with each other or a reaction product generated by a reaction between the fluids.

The tube 109 is formed of, for example, polytetrafluoroethylene (PTFE), perfluoroalkoxyalkane (PFA), or the like. The tube 109 is connected to the microreactor 107, pumps, containers, and the like via joints (not shown).

As the first fluid pump 105 and the second fluid pump 106, for example, an appropriate pump such as a tube pump, a plunger pump, a diaphragm pump, or a screw pump is used. Examples of materials of liquid contact portions such as tubes, syringes, and diaphragms provided in the pumps include resin materials such as polydimethylsiloxane (PDMS), silicone resin, polyethylene (PE), polypropylene (PP), and fluorine-based resin including PTFE.

Here, a specific example of the microreactor 107 that can be used in the microreactor system 1 will be described.

Figure 2:
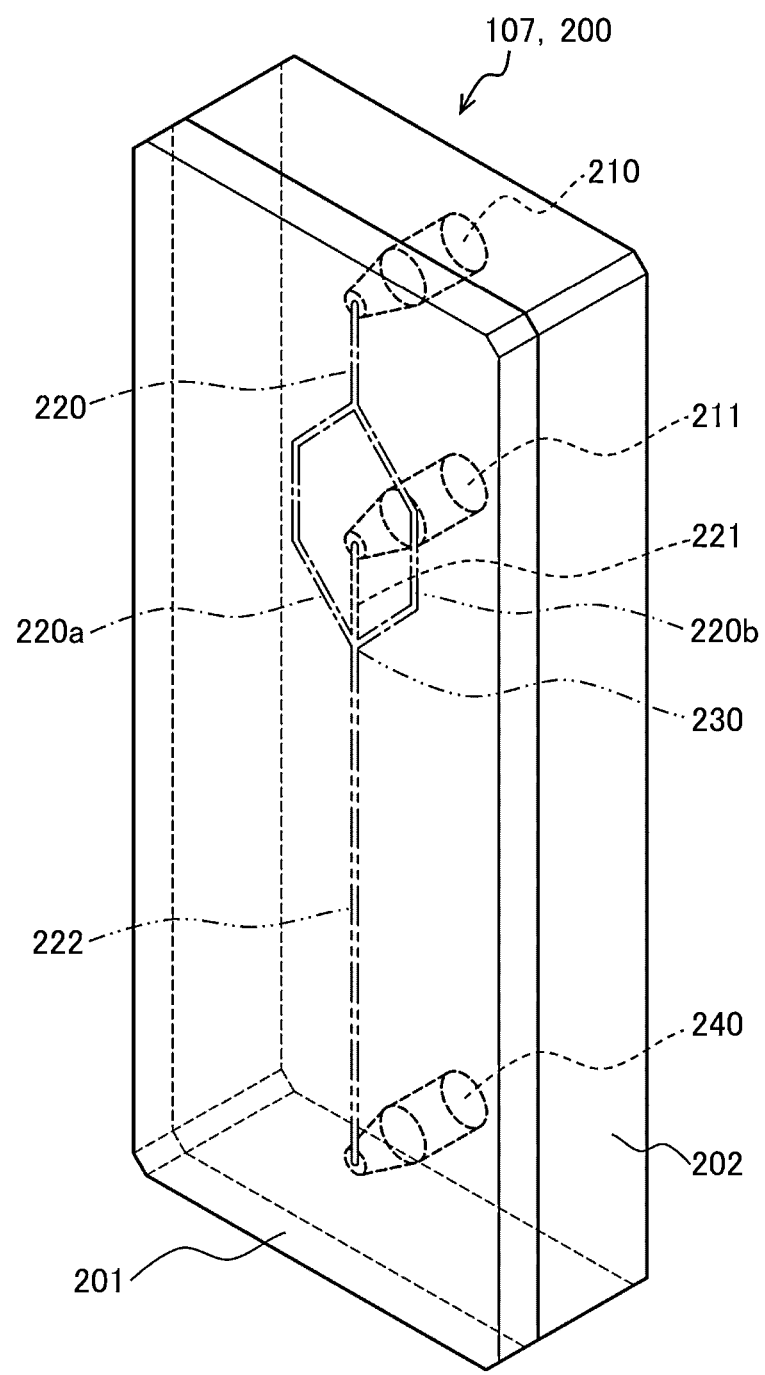
FIG. 2 is a diagram showing an example of a microreactor.

FIG. 2 is a diagram showing an example of a microreactor.

As shown in FIG. 2, a microreactor 200 in which flow path volumes are asymmetrically provided between fluids can be used as the microreactor 107 in which fluids of raw materials are mixed and reacted.

The microreactor 200 has two inflow ports (210, 211) through which fluids are introduced, minute flow paths (220, 221, 222) through which the individually introduced fluids are merged and mixed, and an outflow port 240 through which the mixed fluids merged at a junction 230 flow out to the outside.

The microreactor 200 is formed by overlapping an upper plate 201 and a lower plate 202. The upper plate 201 is subjected to groove processing, and the lower plate 202 is overlapped in a manner of covering grooves, so that the minute flow paths (220, 221, 222) are formed on the same plane. However, the groove processing is not necessarily performed on the upper plate 201. The groove processing may be performed on the lower plate 202, and the upper plate 201 may be overlapped in a manner of covering grooves to form the minute flow paths (220, 221, 222) on the same plane.

The lower plate 202 is formed with through holes at positions overlapping with ends of the minute flow paths (220, 221, 222). As the through holes, a high flow rate side inflow port 210, a low flow rate side inflow port 211, and the outflow port 240 are opened on an opposite surface.

The through holes of the lower plate 202 have a diameter larger than that of the minute flow paths (220, 221, 222). A screw groove (not shown) is formed in the through hole. The tube 109 is connected via joints that can be screwed into the screw groove. However, the through hole is not necessarily provided with a diameter larger than that of the minute flow paths (220, 221, 222). For example, the tube 109 may be directly connected to the through hole without forming a screw groove in the through hole.

The minute flow paths (220, 221, 222) include a high flow rate side flow path 220 extending from the high flow rate side inflow port 210 to the junction 230, a low flow rate side flow path 221 extending from the low flow rate side inflow port 211 to the junction 230, and a discharge flow path 222 extending from the junction 230 to the outflow port 240.

The high flow rate side flow path 220, the low flow rate side flow path 221, and the discharge flow path 222 preferably have a flow path width and a flow path depth of 2 mm or less. In particular, the portion immediately before the junction 230 and the discharge flow path 222 preferably have the flow path width and the flow path depth in a range of several tens of μm or more and 1 mm or less from the viewpoint of performing rapid mixing.

The high flow rate side flow path 220 is used to flow a fluid that has a high mixing ratio and that is set to a relatively high flow rate among the fluids to be mixed. On the other hand, the low flow rate side flow path 221 is used to flow a fluid that has a low mixing ratio and that is set to a relatively low flow rate.

The high flow rate side flow path 220 has a total flow path volume larger than that of the low flow rate side flow path 221. For example, a flow path length of the high flow rate side flow path 220 is larger than that of the low flow rate side flow path 221 having the same flow path width and flow path depth. With such a structure, in a case in which the mixing ratio is biased to one of the fluids and the fluids are controlled to have flow rates greatly different from each other, it is possible to reduce a difference between timings at which the fluids reach the junction 230.

The high flow rate side flow path 220 is branched into two symmetrical branch flow paths 220a and 220b at an intermediate portion, and the branch flow paths merge with each other at the junction 230. The low flow rate side flow path 221 is connected to the junction 230 from between the two branch flow paths 220a and 220b. At the junction 230, a fluid having a low flow rate and a fluid having a high flow rate flowing in from the same side flow into the discharge flow path 222 on the opposite side. With such a structure, since the mixing is started in a state in which the fluid having a low flow rate is mixed in the fluid having a high flow rate, it is possible to increase an area of an interface between the fluids and increase the mixing efficiency.

The microreactor 107 is formed of an appropriate material that is chemically stable, that has low reactivity with fluids and low elution properties, and that has processability and mechanical properties. Examples of the material of the microreactor 107 include stainless steel, silicon, gold, glass, Hastelloy, ceramic, silicone resin, a cycloolefin polymer, a cycloolefin copolymer, polyethylene (PE), polypropylene (PP), polymethylpentene (PMP), polydimethylsiloxane (PDMS), acrylonitrile-butadiene-styrene (ABS) resin, polycarbonate (PC), acrylic resin, and various fluorine-based resins. In addition, glass lining, coating of nickel, gold, or the like, or a material obtained by performing an oxidation treatment on silicon or the like may be used.

As shown in FIG. 1, the microreactor system 1 includes, as containers in which fluids different from the first fluid and the second fluid are prepared, the third fluid container 103 connected to a first system extending from the first fluid container 101, and the fourth fluid container 104 connected to a second system extending from the second fluid container 102.

In the microreactor system 1, the tube 109 of the first system to which the first fluid container 101 is connected is provided with the first switch 112 between the first fluid container 101 and the first fluid pump 105. The first switch 112 is connected to the third fluid container 103 via the tube 109.

The third fluid container 103 is a container in which a third fluid different from the first fluid and the second fluid is prepared. The first switch 112 is a valve that switches the first fluid to be fed to the microreactor 107 to another fluid (a third fluid) different from the first fluid and the second fluid.

The first switch 112 is switchable between a state in which a flow path from the first fluid container 101 to the microreactor 107 is opened and a flow path from the third fluid container 103 to the microreactor 107 is closed and a state in which the flow path from the first fluid container 101 to the microreactor 107 is closed and the flow path from the third fluid container 103 to the microreactor 107 is opened.

In the microreactor system 1, the tube 109 of the second system to which the second fluid container 101 is connected is provided with the second switch 113 between the second fluid container 102 and the second fluid pump 106. The second switch 113 is connected to the fourth fluid container 104 via the tube 109.

The fourth fluid container 104 is a container in which a fourth fluid different from the first fluid and the second fluid is prepared. The second switch 113 is a valve that switches the second fluid to be fed to the microreactor 107 to another fluid (a fourth fluid) different from the first fluid and the second fluid.

The second switch 113 is switchable between a state in which a flow path from the second fluid container 102 to the microreactor 107 is opened and a flow path from the fourth fluid container 104 to the microreactor 107 is closed and a state in which the flow path from the second fluid container 102 to the microreactor 107 is closed and the flow path from the fourth fluid container 104 to the microreactor 107 is opened.

In FIG. 1, three-way valves are provided as the switches 112 and 113. However, as the switches 112 and 113, appropriate devices can be provided as long as the devices can switch the fluid to be fed to the microreactor 107. For example, a combination of a plurality of two-way valves may be used as the switches 112 and 113. In addition, a detachable sterile connection joint or the like having a valve function may be used.

The third fluid and the fourth fluid are fluids that are fed toward the microreactor 107 instead of the first fluid and the second fluid of raw materials prepared in the fluid containers 101 and 102 when the first fluid and the second fluid are exhausted. By feeding the third fluid and the fourth fluid, the fluid inside the microreactor 107 and inside the tube 109 is pushed out to a discharge side. Further, by switching the fluid to be fed, the air inside the fluid containers 101 and 102 is prevented from flowing into the microreactor 107.

Unlike the first fluid and the second fluid, fluids that do not contain components of the raw materials are used as the third fluid and the fourth fluid. As the third fluid and the fourth fluid, appropriate fluids can be used as long as the fluids do not significantly react with the first fluid, the second fluid, the components of the raw materials, and the like. The third fluid and the fourth fluid may be the same type of fluids, or may be fluids different from each other.

Specific examples of the third fluid and the fourth fluid include a solvent, a cleaning liquid, a buffer solution, physiological saline, ion-exchanged water, and pure water that are used in the first fluid and the second fluid. Examples of the cleaning liquid include alcohols such as ethanol and an aqueous ethanol solution, other organic solvents, and a solution to which a cleaning agent such as a surfactant is added. Examples of the buffer solution include a pH buffer solution such as an acidic buffer solution and an alkaline buffer solution.

The third fluid and the fourth fluid are preferably fluids that are unlikely to react with the components of the raw materials and the mixture or the reaction product produced by the mixing and the reaction. The third fluid and the fourth fluid are preferably fluids that are not compatible with the first fluid and the second fluid and that are in a two-phase state. When such fluids are used, even if the switched fluids come into contact with each other at the time of switching the fluids, the reaction and the mixing does not easily proceed. Therefore, the utilization efficiency of the fluids of the raw materials is unlikely to decrease.

In the microreactor system 1, the first fluid container 101 is provided with the first fluid sensor 110. The second fluid container 102 is provided with the second fluid sensor 111. The first fluid sensor 110 is a sensor that measures an amount of the first fluid inside the first fluid container 101. The second fluid sensor 111 is a sensor that measures an amount of the second fluid inside the second fluid container 102.

In FIG. 1, electronic balances are provided as the sensors 110 and 111, and the fluid containers 101 and 102 are placed on sample dishes. According to the electronic balances, a remaining amount of the fluid in each container can be obtained based on the comparison with an initial weight. However, as the fluid sensors 110 and 111, as long as the amounts of the fluids inside the fluid containers 101 and 102 can be obtained, appropriate devices can be provided according to the type of the liquid, the amount of the liquid, and the like.

The fluid sensors 110 and 111 may be devices that directly measure the amounts of the fluids inside the fluid containers 101 and 102, or may be devices that indirectly obtain the amounts of the fluids based on measurement. For example, after a known amount of fluid is prepared in each of the fluid containers 101 and 102, the amount of the fluid discharged from each of the fluid containers 101 and 102 may be measured, and the remaining amount of the fluid may be obtained based on a difference with respect to the known amount.

Specific examples of the fluid sensors 110 and 111 include, in addition to the electronic balance, a load sensor that measures a change in load, a liquid level detection sensor that measures a liquid level, and a flow rate sensor that measures a flow rate of a liquid fed to the microreactor 107.

Depending on the specifications of the first fluid pump 105 and the second fluid pump 106, when the insides of the first fluid container 101, the second fluid container 102, the third fluid container 103, and the fourth fluid container 104 become significantly negative pressure, the first fluid, the second fluid, the third fluid, and the fourth fluid cannot be fed. Therefore, devices that pressurize the first fluid container 101, the second fluid container 102, the third fluid container 103, and the fourth fluid container 104 may be provided. Specifically, each of the first fluid container 101, the second fluid container 102, the third fluid container 103, and the fourth fluid container 104 may be placed in a pressure container that can pressurize the fluid containers, or may be pressurized by being physically pressed from the outside.

According to such a microreactor system 1, since the third fluid container 103 is connected to the first system to which the first fluid container 101 is connected, and the fourth fluid container 104 is connected to the second system to which the second fluid container 102 is connected, in both of the first system and the second system, the fluid of the raw material prepared in each of the fluid containers 101 and 102 can be switched to another fluid. The fluid containers 103 and 104 in which other fluids are prepared are individually provided for the first system and the second system. Therefore, the type of the fluid to be switched can be selected in consideration of the compatibility of each fluid of the raw material. In addition, the fluid to be switched can be individually prepared, replaced, discarded, or the like.

Next, a specific operation method of the microreactor system 1 will be described.

Figure 3:
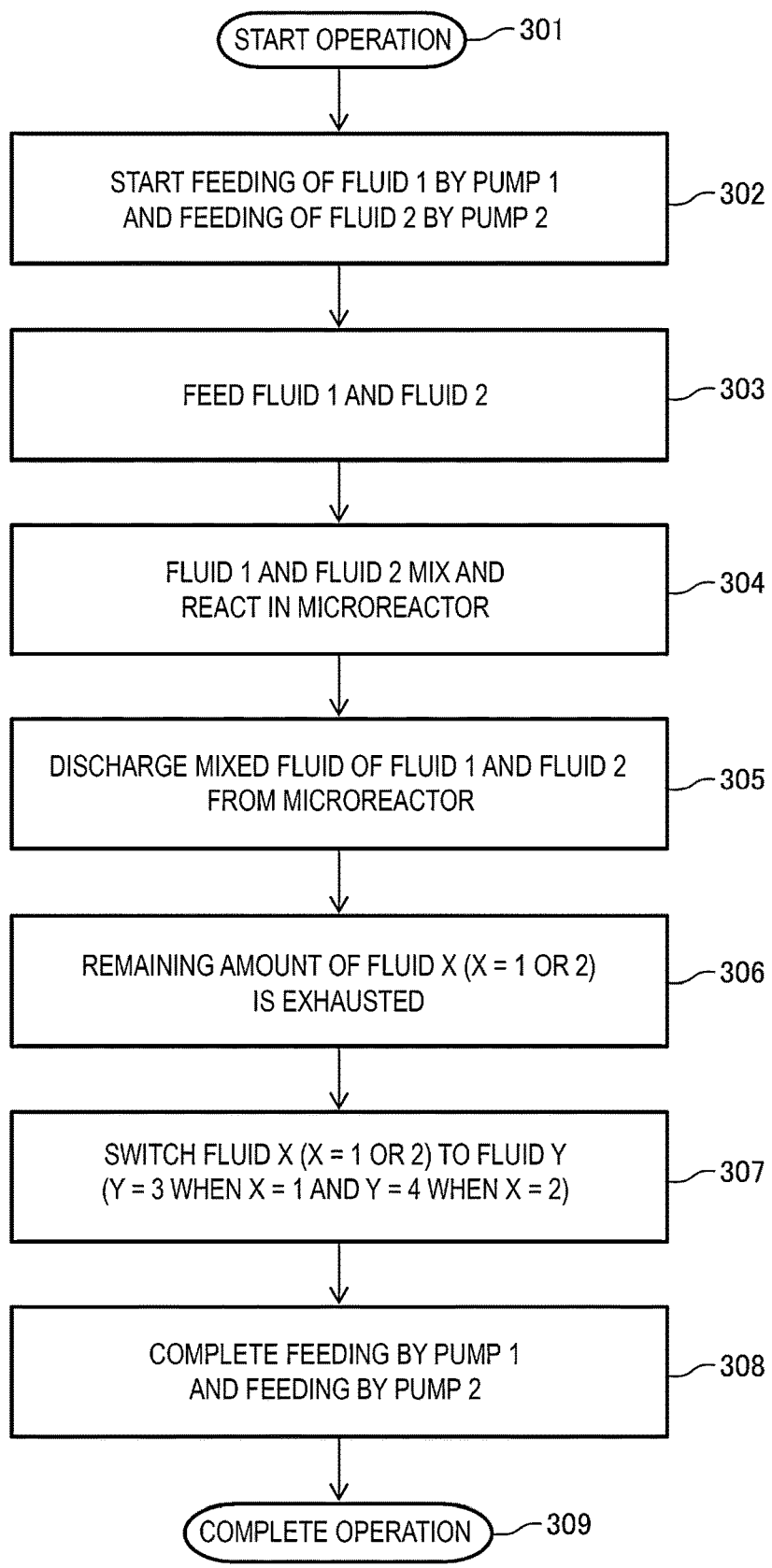
FIG. 3 is a flowchart showing an example of an operation method of the microreactor system.

FIG. 3 is a flowchart showing an example of the operation method of the microreactor system.

In the operation method shown in FIG. 3, in the microreactor system 1, after the feeding of the first fluid and the second fluid is started, when it is measured that the fluid in one of the first fluid container 101 and the second fluid container 102 is exhausted, the fluid on the side where the remaining amount is exhausted is switched to another fluid (the third fluid or the fourth fluid) different from the first fluid and the second fluid, and the feeding of the first fluid and the second fluid is completed without switching the fluid in the other container in which the remaining amount is not exhausted to another fluid (the third fluid or the fourth fluid) different from the first fluid and the second fluid.

In the operation method, the first fluid, the second fluid, the third fluid, and the fourth fluid are put into the fluid containers 101, 102, 103, and 104, respectively, and the operation of the system is started (step S301). The first switch 112 is in a state in which the flow path from the first fluid container 101 is opened and the flow path from the third fluid container 103 is closed. The second switch 113 is in a state in which the flow path from the second fluid container 102 is opened and the flow path from the fourth fluid container 104 is closed.

Subsequently, the feeding of the first fluid performed by the first fluid pump 105 and the feeding of the second fluid performed by the second fluid pump 106 are started (step S302). By starting the fluid pumps 105 and 106, the feeding of the fluid from the fluid containers 101 and 102 to the microreactor 107 is started.

After the fluid pumps 105 and 106 are started, the first fluid and the second fluid are fed to the junction inside the microreactor 107 through the tube 109 (step S303). For example, in the case of the microreactor 200 (see FIG. 2), when the first fluid is controlled to have a relatively high flow rate, the first fluid is introduced into the high flow rate side inflow port 210, and the second fluid is introduced into the low flow rate side flow path 221. The first fluid flows through the high flow rate side flow path 220 and reaches the junction 230. The second fluid flows through the low flow rate side flow path 221 and reaches the junction 230.

When the first fluid and the second fluid are fed to the microreactor 107, the first fluid and the second fluid start mixing and reaction inside the microreactor 107 (step S304). For example, in the case of the microreactor 200 (see FIG. 2), the mixed fluid in which the mixing and the reaction are started flows downstream of the junction 230.

Next, the mixed fluid in which the first fluid and the second fluid start mixing and reaction is discharged from the microreactor 107 (step S305). For example, in the case of the microreactor 200 (see FIG. 2), the mixed fluid after merging at the junction 230 flows through the discharge flow path 222 and is discharged through the outflow port 240. The mixed fluid discharged from the microreactor 107 flows through the tube 109 while continuing mixing or reaction, and is finally collected in the collection container 108.

When the feeding of each fluid continues, since the remaining amount of the fluid in any one of the first fluid container 101 and the second fluid container 102 is exhausted (step S306), such a state is detected by measuring the amount of the fluid. The amounts of the fluids inside the fluid containers 101 and 102 are measured by the fluid sensors 110 and 111 at appropriate time intervals during the operation of the system.

When it is measured that the fluid in any one of the containers is exhausted, the fluid on the side where the remaining amount is exhausted is switched to another fluid (step S307). When the amount of the fluid in the container is below a threshold close to zero, it is determined that the fluid is exhausted, and fluid switching can be performed. Flow path switching performed by the switches 112 and 113 is controlled based on measurement executed by the fluid sensors 110 and 111.

In a case in which the remaining amount of the first fluid in the container is first exhausted, the first fluid fed toward the microreactor 107 is switched to the third fluid. On the other hand, in a case in which the remaining amount of the second fluid in the container is first exhausted, the second fluid fed toward the microreactor 107 is switched to the fourth fluid.

After the fluid fed toward the microreactor 107 is switched, the feeding performed by the first fluid pump 105 and the feeding performed by the second fluid pump 106 are completed at the stage in which the collection of a mixed fluid discharged from the microreactor 107 is completed (step S308). The feeding of each fluid is stopped by stopping a respective one of the fluid pumps 105 and 106. Thereafter, the operation of the system is completed (step S309).

As described above, according to the operation method of switching only the fluid on the side where the remaining amount is first exhausted to another fluid, even if the fluid in the container is exhausted during the operation of the pump, another fluid is fed toward the microreactor. By feeding another fluid, the fluid already fed toward the microreactor is pushed out to the discharge side. In addition, even if the gas in the container is suctioned, the gas can be prevented from flowing into the microreactor by switching the fluid to be fed.

Therefore, the fluid of the raw material prepared in the container can be mixed and reacted in the microreactor until the end. That is, the fluid of the raw material can be used for mixing or reaction in the vicinity of a bottom portion of the container without leaving a large amount of fluid in the container.

Therefore, according to such an operation method, the fluid of the raw material can be efficiently used. Since a large amount of fluid of the raw material does not remain inside the fluid container, inside the microreactor, or inside the pipe, even if the fluid of the raw material is a toxic substance, a hazardous substance, or the like, a risk due to contact at the time of disposal and costs of post-treatment can be reduced.

Figure 4:
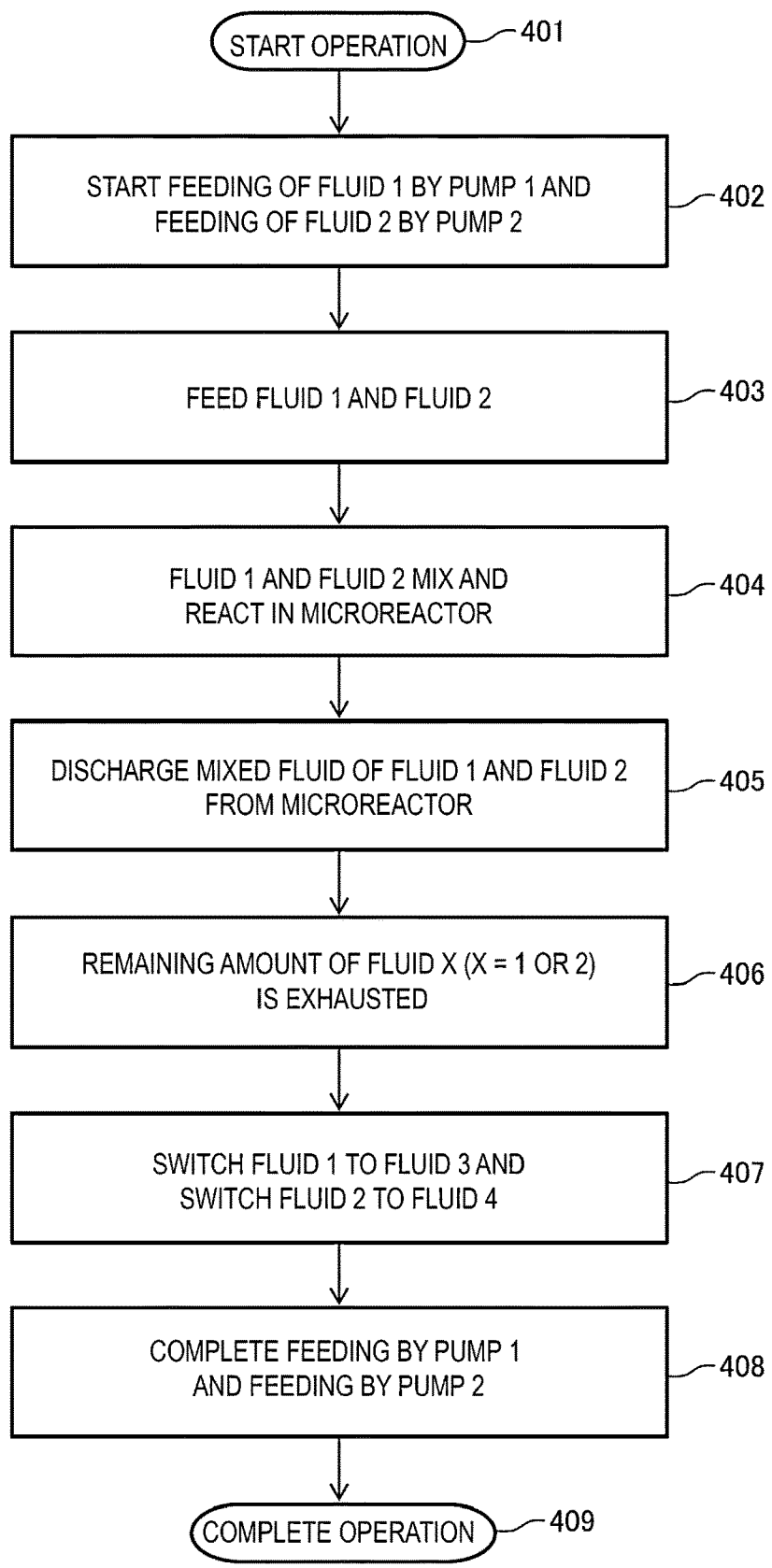
FIG. 4 is a flowchart showing an example of the operation method of the microreactor system.

FIG. 4 is a flowchart showing an example of the operation method of the microreactor system.

In the operation method shown in FIG. 4, in the microreactor system 1, after the feeding of the first fluid and the second fluid is started, when it is measured that the fluid in one of the first fluid container 101 and the second fluid container 102 is exhausted, the fluid on the side where the remaining amount is exhausted is switched to another fluid (the third fluid or the fourth fluid) different from the first fluid and the second fluid, and the other fluid whose remaining amount is not exhausted is switched to another fluid (the third fluid or the fourth fluid) different from the first fluid and the second fluid.

In this operation method, similarly to the operation method (see FIG. 3) described above, the start of the operation of the system (step S401), the start of the feeding of the first fluid and the second fluid (step S402), the feeding to the junction of the microreactor 107 (step S403), the mixing and the reaction inside the microreactor 107 (step S404), and the discharge of the mixed fluid from the microreactor 107 (step S405) are proceeded.

When the feeding of each fluid continues, since the remaining amount of the fluid in any one of the first fluid container 101 and the second fluid container 102 is exhausted (step S406), such a state is detected by measuring the amount of the fluid. The amounts of the fluids inside the fluid containers 101 and 102 are measured by the fluid sensors 110 and 111 at appropriate time intervals during the operation of the system.

When it is measured that the fluid in any one of the containers is exhausted, both the fluid on the side where the remaining amount is exhausted and the other fluid whose remaining amount is not exhausted are switched to another fluid (step S407). When the amount of the fluid in the container is below a threshold close to zero, it is determined that the fluid is exhausted, and fluid switching can be performed. Flow path switching performed by the switches 112 and 113 is controlled based on measurement executed by the fluid sensors 110 and 111.

In both the case in which the remaining amount of the first fluid in the container is first exhausted and the case in which the remaining amount of the second fluid in the container is first exhausted, the first fluid fed toward the microreactor 107 is switched to the third fluid, and the second fluid fed toward the microreactor 107 is switched to the fourth fluid.

After the fluid fed to the microreactor 107 is switched, the feeding performed by the first fluid pump 105 and the feeding performed by the second fluid pump 106 are completed at the stage in which the collection of a mixed fluid discharged from the microreactor 107 is completed (step S408). The feeding of each fluid is stopped by stopping a respective one of the fluid pumps 105 and 106. Thereafter, the operation of the system is completed (step S409).

As described above, according to the operation method of switching both the fluid on the side where the remaining amount is exhausted and the other fluid on the side where the remaining amount is not exhausted to another fluid, even if the fluid in the container is exhausted during the operation of the pump, another fluid is fed toward the microreactor. By feeding another fluid, the fluid already fed toward the microreactor is pushed out to the discharge side. In addition, even if the gas in the container is suctioned, the gas can be prevented from flowing into the microreactor by switching the fluid to be fed.

Therefore, according to such an operation method, the fluid of the raw material can be efficiently used. At this time, since the other fluid on the side where the remaining amount is not exhausted is also switched to another fluid at the same time, even on the side where the remaining amount is not exhausted, the fluid already fed toward the microreactor can be pushed out to the discharge side by another fluid. That is, in any of the systems, the fluid of the raw material can be removed from the inside of the microreactor or the inside of the pipe by the end of the mixing and the reaction. Therefore, even if the fluid of the raw material is a toxic substance, a hazardous substance, or the like, it is possible to reduce the risk due to contact at the time of disposal and the costs of post-treatment for any of the systems.

Figure 5:
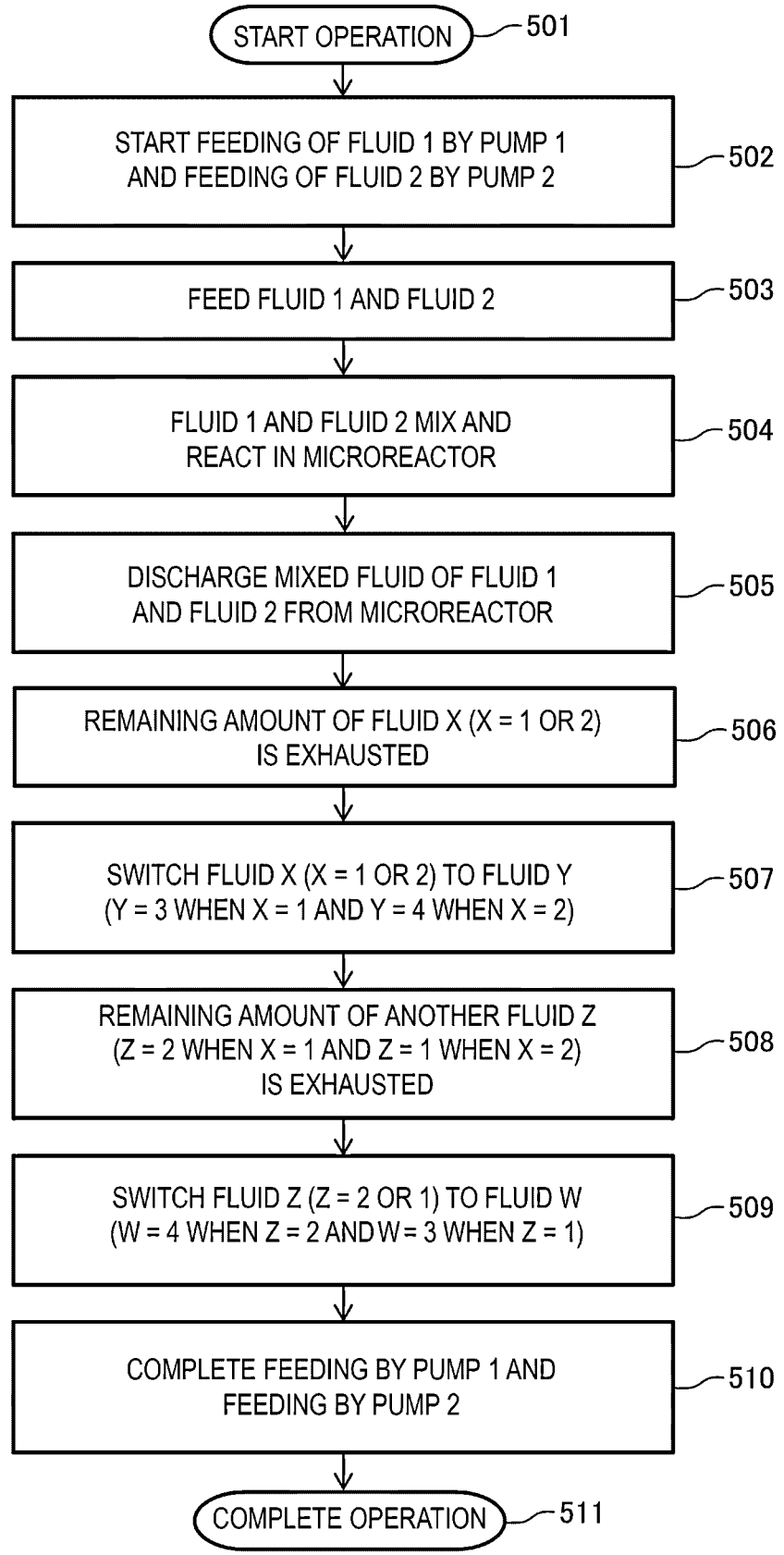
FIG. 5 is a flowchart showing an example of the operation method of the microreactor system.

FIG. 5 is a flowchart showing an example of the operation method of the microreactor system.

In the operation method shown in FIG. 5, in the microreactor system 1, after the feeding of the first fluid and the second fluid is started, when it is measured that the fluid in one of the first fluid container 101 and the second fluid container 102 is exhausted, the fluid on the side where the remaining amount is first exhausted is switched to another fluid (the third fluid or the fourth fluid) different from the first fluid and the second fluid. When it is measured that the fluid in the other container is exhausted after the fluid on the side where the remaining amount is first exhausted is switched, the fluid on the side where the remaining amount is exhausted later is switched to another fluid (the third fluid or the fourth fluid) different from the first fluid and the second fluid.

In this operation method, similarly to the operation method (see FIG. 3) described above, the start of the operation of the system (step S501), the start of the feeding of the first fluid and the second fluid (step S502), the feeding to the junction of the microreactor 107 (step S503), the mixing and the reaction inside the microreactor 107 (step S504), and the discharge of the mixed fluid from the microreactor 107 (step S505) are proceeded.

When the feeding of each fluid continues, since the remaining amount of the fluid in any one of the first fluid container 101 and the second fluid container 102 is exhausted (step S506), such a state is detected by measuring the amount of the fluid. The amounts of the fluids inside the fluid containers 101 and 102 are measured by the fluid sensors 110 and 111 at appropriate time intervals during the operation of the system.

When it is measured that the fluid in any one of the containers is exhausted, the fluid on the side where the remaining amount is first exhausted is switched to another fluid (step S507). When the amount of the fluid in the container is below a threshold close to zero, it is determined that the fluid is exhausted, and fluid switching can be performed. Flow path switching performed by the switches 112 and 113 is controlled based on measurement executed by the fluid sensors 110 and 111.

In a case in which the remaining amount of the first fluid in the container is first exhausted, the first fluid fed toward the microreactor 107 is switched to the third fluid. On the other hand, in a case in which the remaining amount of the second fluid in the container is first exhausted, the second fluid fed toward the microreactor 107 is switched to the fourth fluid.

When the feeding of each fluid continues, since the remaining amount of the other fluid in the first fluid container 101 and the second fluid container 102 is exhausted (step S508), such a state is detected by measuring the amount of the fluid.

When it is measured that the fluid in the container on the side where the fluid remains is exhausted, the fluid on the side where the remaining amount is exhausted later is switched to another fluid (step S509).

After the fluid fed toward the microreactor 107 is switched, the feeding performed by the first fluid pump 105 and the feeding performed by the second fluid pump 106 are completed at the stage in which the collection of a mixed fluid discharged from the microreactor 107 is completed (step S510). The feeding of each fluid is stopped by stopping a respective one of the fluid pumps 105 and 106. Thereafter, the operation of the system is completed (step S511).

As described above, according to the operation method of switching the fluid on the side where the remaining amount is first exhausted to another fluid and then switching the fluid on the side where the remaining amount is exhausted later to another fluid, even if the fluid in the container is exhausted during the operation of the pump, another fluid is fed toward the microreactor. By feeding another fluid, the fluid already fed toward the microreactor is pushed out to the discharge side. In addition, even if the gas in the container is suctioned, the gas can be prevented from flowing into the microreactor by switching the fluid to be fed.

Therefore, according to such an operation method, the fluid of the raw material can be efficiently used. At this time, since the other fluid on the side where the remaining amount is not exhausted is also switched to another fluid thereafter, even on the side where the remaining amount is not exhausted, the fluid of the raw material prepared in the fluid container can be discharged in the vicinity of the bottom portion of the container. Further, the fluid already fed toward the microreactor can be pushed out to the discharge side by another fluid. That is, in any of the systems as well, the fluid of the raw material can be removed from the inside of the microreactor or the inside of the pipe by the end of the mixing and the reaction. Therefore, even if the fluid of the raw material is a toxic substance, a hazardous substance, or the like, it is possible to reduce the risk due to contact at the time of disposal and the costs of post-treatment for any of the systems.

The microreactor 107 may be a single-use (disposable) type microreactor that is discarded after a single use. Examples of a material of the single-use type microreactor 107 include PE, PP, PMP, PDMS, PC, acrylic resin, and fluorine-based resin. In addition to the microreactor 107, the fluid containers 101, 102, 103, and 104, the collection container 108, the tube 109, the switches 112 and 113, the joints, and other liquid contact portions may be of a single-use type.

At least one or more of the first fluid container 101, the second fluid container 102, the third fluid container 103, and the fourth fluid container 104, the first switch 112, the second switch 113, and the tube 109 connected to the first switch 112 and the second switch 113 are preferably of a single-use type. When the at least one or more of the first fluid container 101, the second fluid container 102, the third fluid container 103, and the fourth fluid container 104, the first switch 112, the second switch 113, and the tube 109 are of a single-use type, even if the fluid of the raw material is a toxic substance, a hazardous substance, or the like, the toxic substance, the hazardous substance, or the like can be post-treated together with the remaining fluid, and thus it is possible to reduce the risk due to contact at the time of disposal and the costs of post-treatment. In addition, by using detachable sterile connection joints as the switches 112 and 113, the switches 112 and 113 can be disassembled into a size that is easy to carry at the time of disposal.

Second Embodiment

Next, a microreactor system according to a second embodiment of the invention will be described with reference to the drawings.

Figure 6:
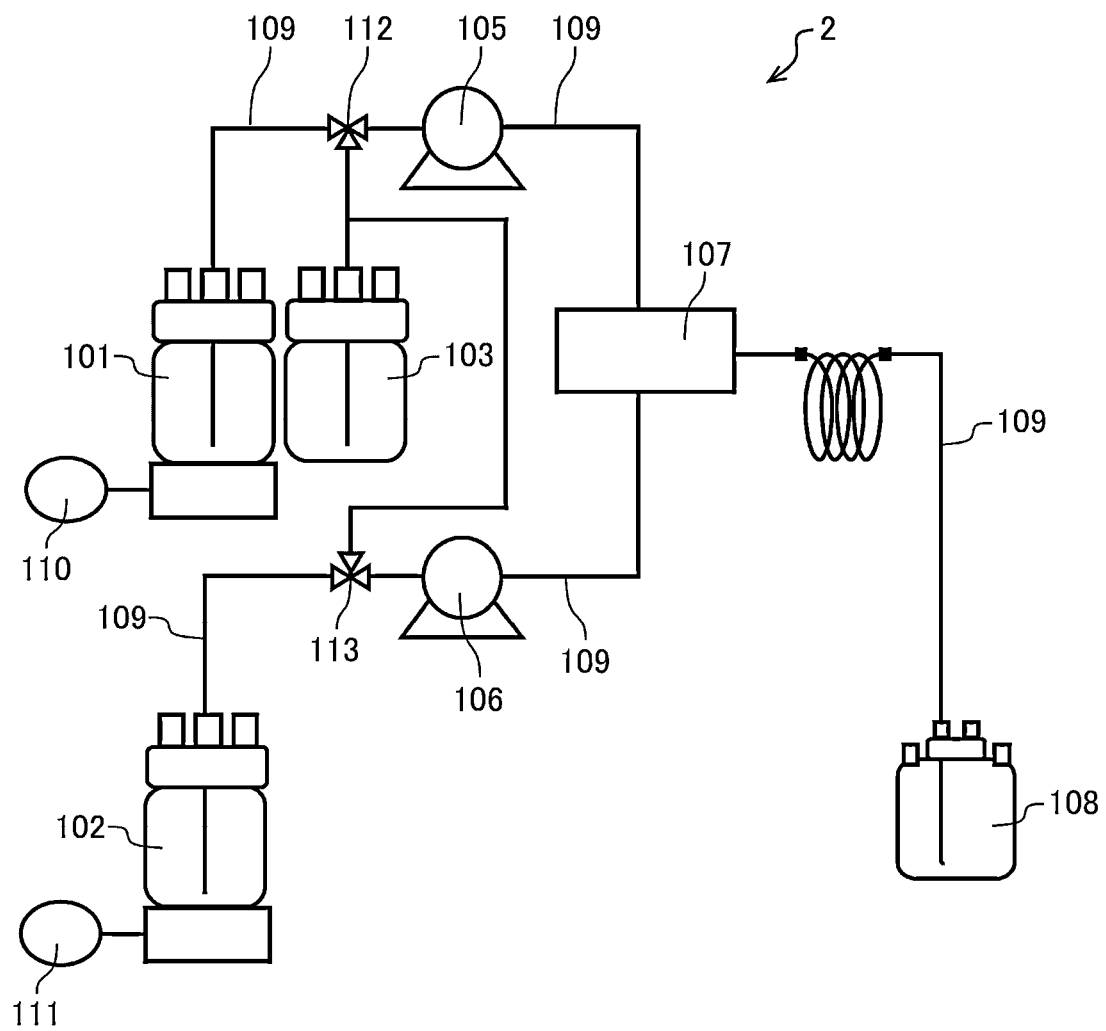
FIG. 6 is a schematic diagram of a microreactor system according to a second embodiment.

FIG. 6 is a schematic diagram of the microreactor system according to the second embodiment.

As shown in FIG. 6, similarly to the microreactor system 1 described above, a microreactor system 2 according to the second embodiment includes the first fluid container (the first container) 101, the second fluid container (the second container) 102, the third fluid container (the third container) 103, the first fluid pump (the first pump) 105, the second fluid pump (the second pump) 106, the microreactor 107, the collection container 108, the tube 109, the first fluid sensor (the first measurement unit) 110, the second fluid sensor (the second measurement unit) 111, the first switch (the first switching unit) 112, and the second switch (the second switching unit) 113.

The microreactor system 2 is different from the microreactor system 1 described above in that the microreactor system 2 includes, as a container in which another fluid different from a first fluid and a second fluid is prepared, the third fluid container 103 connected to both a first system and a second system.

In the microreactor system 2, the tube 109 of the first system to which the first fluid container 101 is connected is provided with the first switch 112 between the first fluid container 101 and the first fluid pump 105. The first switch 112 is connected to the third fluid container 103 via the tube 109.

The tube 109 of the second system to which the second fluid container 102 is connected is provided with the second switch 113 between the second fluid container 102 and the second fluid pump 106. The second switch 113 is connected to the third fluid container 103 via the tube 109.

In the microreactor system 2, the first switch 112 is switchable between a state in which a flow path from the first fluid container 101 to the microreactor 107 is opened and a flow path from the third fluid container 103 to the microreactor 107 is closed and a state in which the flow path from the first fluid container 101 to the microreactor 107 is closed and the flow path from the third fluid container 103 to the microreactor 107 is opened.

The second switch 113 is switchable between a state in which a flow path from the second fluid container 102 to the microreactor 107 is opened and the flow path from the third fluid container 103 to the microreactor 107 is closed and a state in which the flow path from the second fluid container 102 to the microreactor 107 is closed and the flow path from the third fluid container 103 to the microreactor 107 is opened.

In the microreactor system 2, it is possible to use an operation method (see FIG. 3). In the operation method, after the feeding of the first fluid and the second fluid is started, when it is measured that the fluid in one of the first fluid container 101 and the second fluid container 102 is exhausted, the fluid on the side where the remaining amount is exhausted is switched to another fluid (a third fluid) different from the first fluid and the second fluid, and the feeding of the first fluid and the second fluid is completed without switching the fluid in the other container whose remaining amount is not exhausted to another fluid (the third fluid) different from the first fluid and the second fluid.

In the microreactor system 2, it is also possible to use an operation method (see FIG. 4). In the operation method, after the feeding of the first fluid and the second fluid is started, when it is measured that the fluid in one of the first fluid container 101 and the second fluid container 102 is exhausted, the fluid on the side where the remaining amount is exhausted is switched to another fluid (the third fluid) different from the first fluid and the second fluid, and the other fluid whose remaining amount is not exhausted is switched to another fluid (the third fluid) different from the first fluid and the second fluid.

Further, in the microreactor system 2, it is also possible to use an operation method (see FIG. 5). In the operation method, after the feeding of the first fluid and the second fluid is started, when it is measured that the fluid in one of the first fluid container 101 and the second fluid container 102 is exhausted, the fluid on the side where the remaining amount is first exhausted is switched to another fluid (the third fluid) different from the first fluid and the second fluid.

When it is measured that the fluid in the other container is exhausted after the fluid on the side where the remaining amount is first exhausted is switched, the fluid on the side where the remaining amount is exhausted later is switched to another fluid (the third fluid) different from the first fluid and the second fluid.

According to such a microreactor system 2, since the third fluid container 103 is connected to the first system to which the first fluid container 101 is connected and the second system to which the second fluid container 102 is connected, in both of the first system and the second system, the fluid of the raw material prepared in each of the fluid containers 101 and 102 can be switched to another fluid. The fluid container 103 in which another fluid is prepared is integrated as one container and is provided in common for the first system and the second system. Therefore, the overall configuration can be simplified, and the system can be compact. In addition, another fluid can be easily prepared, replaced, disposed of, and the like.

Third Embodiment

Next, a microreactor system according to a third embodiment of the invention will be described with reference to the drawings.

Figure 7:
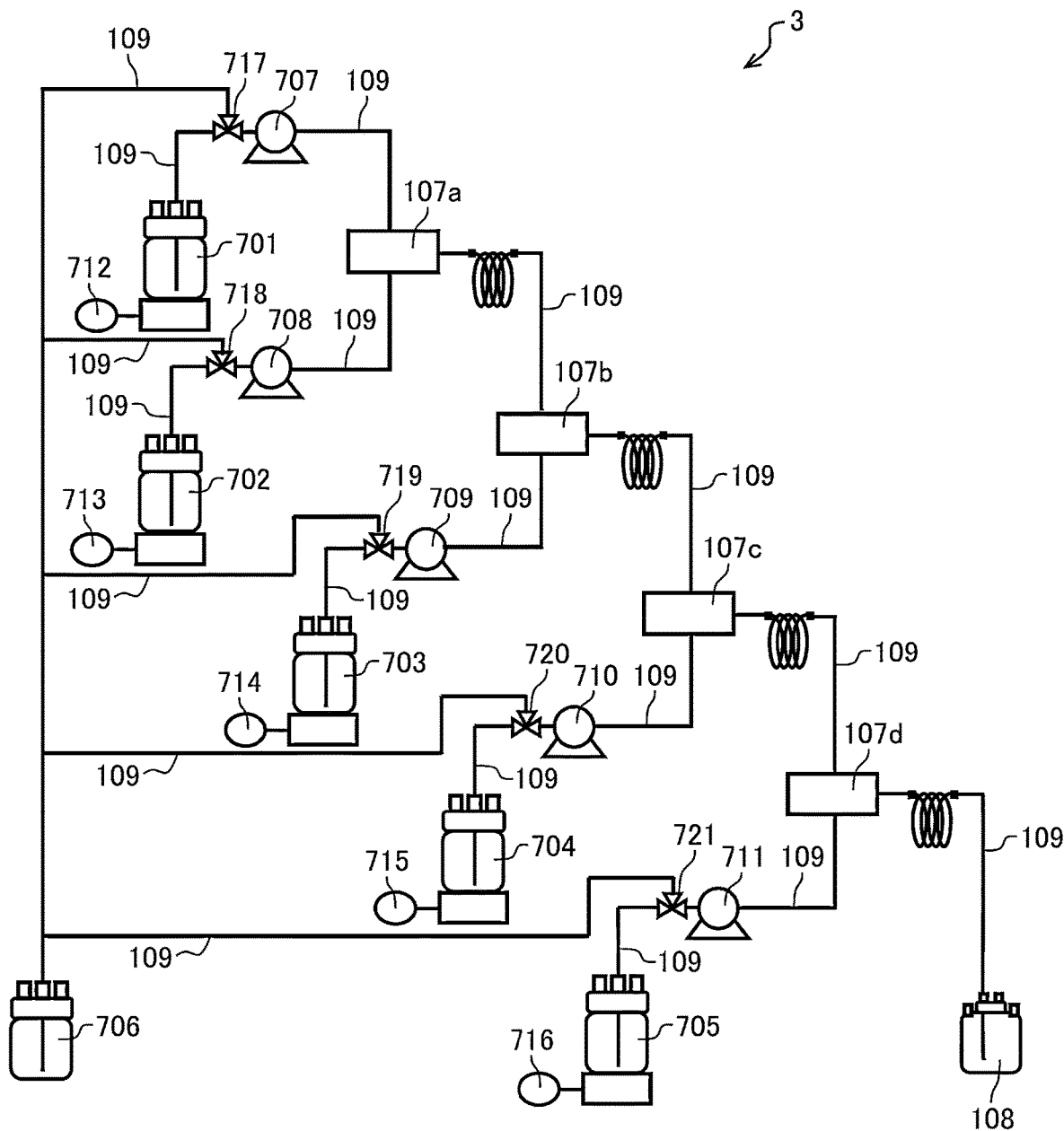
FIG. 7 is a schematic diagram of a microreactor system according to a third embodiment.

FIG. 7 is a schematic diagram of the microreactor system according to the third embodiment.

As shown in FIG. 7, a microreactor system 3 according to the third embodiment includes a microreactor 107a in a first stage and a plurality of microreactors 107b, 107c, and 107d in a second and subsequent stages. FIG. 7 shows a configuration in which a total of four stages of microreactors 107a, 107b, 107c, and 107d are arranged in series.

The microreactor system 3 includes a fluid A container (a first-stage first fluid container) 701, a fluid B container (a first-stage second fluid container) 702, a fluid C container (a container for a fluid to be mixed) 703, a fluid D container (a container for a fluid to be mixed) 704, a fluid E container (a container for a fluid to be mixed) 705, and a fluid F container 706.

The microreactor system 3 includes a fluid A pump (a first-stage first fluid pump) 707, a fluid B pump (a first-stage second fluid pump) 708, a fluid C pump (a pump for a fluid to be mixed) 709, a fluid D pump (a pump for a fluid to be mixed) 710, and a fluid E pump (a pump for a fluid to be mixed) 711.

The microreactor system 3 includes the first microreactor 107a constituting a first stage, the second microreactor 107b constituting a second stage, the third microreactor 107c constituting a third stage, the fourth microreactor 107d constituting a fourth stage, the collection container 108, and the tube 109.

The microreactor system 3 includes a fluid A sensor (a measurement unit for the first-stage first fluid) 712, a fluid B sensor (a measurement unit for the first-stage second fluid) 713, a fluid C sensor (a measurement unit for a fluid to be mixed) 714, a fluid D sensor (a measurement unit for a fluid to be mixed) 715, and a fluid E sensor (a measurement unit for a fluid to be mixed) 716.

The microreactor system 3 also includes a fluid A switch (a switching unit for the first-stage first fluid) 717, a fluid B switch (a switching unit for the first-stage second fluid) 718, a fluid C switch (a switching unit for a fluid to be mixed) 719, a fluid D switch (a switching unit for a fluid to be mixed) 720, and a fluid E switch (a switching unit for a fluid to be mixed) 721.

The microreactor system 3 includes a plurality of microreactors 107a, 107b, 107c, and 107d connected in series to each other. The microreactor system 3 mixes fluids sequentially introduced into the plurality of microreactors 107a, 107b, 107c, and 107d to produce a mixture in which the fluids are mixed or a reaction product (a mixed fluid) generated by a reaction between the fluids.

Each of the first microreactor 107a, the second microreactor 107b, the third microreactor 107c, and the fourth microreactor 107d includes two inflow ports into which fluids are introduced, a minute flow path that merges and mixes the individually introduced fluids, and an outflow port that allows the merged mixed fluid to flow out. As the microreactors 107a, 107b, 107c, and 107d, the microreactor 200 shown in FIG. 2 is preferably used.

A fluid A (a first-stage first fluid) is introduced into the first microreactor 107a from one of the inflow ports. A fluid B (a first-stage second fluid) is introduced from the other of the inflow ports. In the first microreactor 107a, the fluid A and the fluid B are mixed to produce a primary mixed fluid (a fluid A+B). The second microreactor 107b is connected to the outflow port of the first microreactor 107a via the tube 109.

The primary mixed fluid (the fluid A+B) is introduced into the second microreactor 107b from one of the inflow ports. Further, a fluid C (a fluid to be mixed) is introduced from the other of the inflow ports. In the second microreactor 107b, the primary mixed fluid and the fluid C are mixed to produce a secondary mixed fluid (a fluid A+B+C). The third microreactor 107c is connected to the outflow port of the second microreactor 107b via the tube 109.

The secondary mixed fluid (the fluid A+B+C) is introduced into the third microreactor 107c from one of the inflow ports. A fluid D (a fluid to be mixed) is introduced from the other of the inflow ports. In the third microreactor 107c, the secondary mixed fluid and the fluid D are mixed to produce a tertiary mixed fluid (a fluid A+B+C+D). The fourth microreactor 107d is connected to the outflow port of the third microreactor 107c via the tube 109.

The tertiary mixed fluid (the fluid A+B+C+D) is introduced into the fourth microreactor 107d from one of the inflow ports. A fluid E (a fluid to be mixed) is introduced from the other of the inflow ports. In the fourth microreactor 107d, the tertiary mixed fluid and the fluid E are mixed to produce a quaternary mixed fluid (a fluid A+B+C+D+E). The collection container 108 is connected to the outflow port of the fourth microreactor 107d via the tube 109.

As shown in FIG. 7, the microreactor system 3 includes, as containers in which a fluid F different from the fluid A, the fluid B, the fluid C, the fluid D, and the fluid E is prepared, the fluid F container 706 connected to all systems including a fluid A system extending from the fluid A container 701, a fluid B system extending from the fluid B container 702, a fluid C system extending from the fluid C container 703, a fluid D system extending from the fluid D container 704, and a fluid E system extending from the fluid E container 705.

In the microreactor system 3, the tube 109 of the fluid A system to which the fluid A container 701 is connected is provided with the fluid A switch 717 between the fluid A container 701 and the fluid A pump 707. The fluid A switch 717 is connected to the fluid F container 706 via the tube 109.

The tube 109 of the fluid B system to which the fluid B container 702 is connected is provided with a fluid B switch 718 between the fluid B container 702 and the fluid B pump 708. The fluid B switch 718 is connected to the fluid F container 706 via the tube 109.

The tube 109 of the fluid systems to which the fluid containers 703, 704, and 705 of the second and subsequent stages are connected is provided with the switches 719, 720, and 721 between the fluid containers 703, 704, and 705 and the fluid pumps 709, 710, and 711. Each of the switches 719, 720, and 721 is connected to the fluid F container 706 via the tube 109.

In the microreactor system 3, the fluid A switch 717 is switchable between a state in which a flow path from the fluid A container 701 to the first microreactor 107a is opened and a flow path from the fluid F container 706 to the first microreactor 107a is closed and a state in which the flow path from the fluid A container 701 to the first microreactor 107a is closed and the flow path from the fluid F container 706 to the first microreactor 107a is opened.

The fluid B switch 718 is switchable between a state in which a flow path from the fluid B container 702 to the first microreactor 107a is opened and the flow path from the fluid F container 706 to the first microreactor 107a is closed and a state in which the flow path from the fluid B container 702 to the first microreactor 107a is closed and the flow path from the fluid F container 706 to the first microreactor 107a is opened.

The switches 719, 720, and 721 of the second and subsequent stages are switchable between a state in which flow paths from the fluid containers 703, 704, and 705 to the microreactors 107b, 107c, and 107d are opened and flow paths from the fluid F container 706 to the microreactors 107b, 107c, and 107d are closed and a state in which the flow paths from the fluid containers 703, 704, and 705 to the microreactors 107b, 107c, and 107d are closed and the flow paths from the fluid F container 706 to the microreactors 107b, 107c, and 107d are opened.

The fluid A, the fluid B, the fluid C, the fluid D, and the fluid E are fluids of raw materials to be mixed and reacted in the microreactors 107a, 107b, 107c, and 107d. The fluid F is a fluid that is fed toward the microreactors 107a, 107b, 107c, and 107d instead of the fluids of the raw materials prepared in the fluid containers 701, 702, 703, 704, and 705 when the fluids are exhausted.

As the fluid A, the fluid B, the fluid C, the fluid D, and the fluid E, appropriate fluids are used depending on the purpose of the mixing and the reaction. Unlike the fluids of the raw materials, a fluid that does not contain the components of the raw material is used as the fluid F, similarly to the third fluid and the fourth fluid described above.

In the microreactor system 3, the fluid A container 701 is provided with the fluid A sensor 712 that measures an amount of the fluid A in the container. The fluid B container 702 is provided with the fluid B sensor 713 that measures an amount of the fluid B in the container. The fluid C container 703 is provided with the fluid C sensor 714 that measures an amount of the fluid C in the container. The fluid D container 704 is provided with the fluid D sensor 715 that measures an amount of the fluid D in the container. The fluid E container 705 is provided with the fluid E sensor 716 that measures an amount of the fluid E in the container.

As the fluid A sensor 712, the fluid B sensor 713, the fluid C sensor 714, the fluid D sensor 715, and the fluid E sensor 716, a load sensor, a liquid level detection sensor, a flow rate sensor, or the like may be used in addition to the electronic balance, similarly to the fluid sensors 110 and 111 described above.

Depending on the specifications of the fluid pumps 707, 708, 709, 710, and 711, when the insides of the fluid containers 701, 702, 703, 704, 705, and 706 become significantly negative pressure, the fluid A, the fluid B, the fluid C, the fluid D, the fluid E, and the fluid F cannot be fed. Therefore, devices that pressurize the fluid containers 701, 702, 703, 704, 705, and 706 may be provided. Specifically, each of the fluid containers 701, 702, 703, 704, 705, and 706 may be placed in a pressure container that can pressurize the fluid containers, or may be pressurized by being physically pressed from the outside.

According to such a microreactor system 3, since a plurality of microreactors 107a, 107b, 107c, and 107d are provided, it is possible to perform multi-stage mixing and reaction by a flow-type process. Since the fluid F container 706 is connected to each of the systems to which the fluid containers 701, 702, 703, 704, and 705 are connected, the fluid of the raw material prepared in each of the fluid containers 701, 702, 703, 704, and 705 can be switched to another fluid in any of the systems as well. The fluid F container 706 for in which another fluid is prepared is integrated as one container and is provided in common for each system. Therefore, the overall configuration can be simplified, and the system can be compact. In addition, another fluid can be easily prepared, replaced, disposed of, and the like.

Figure 8:
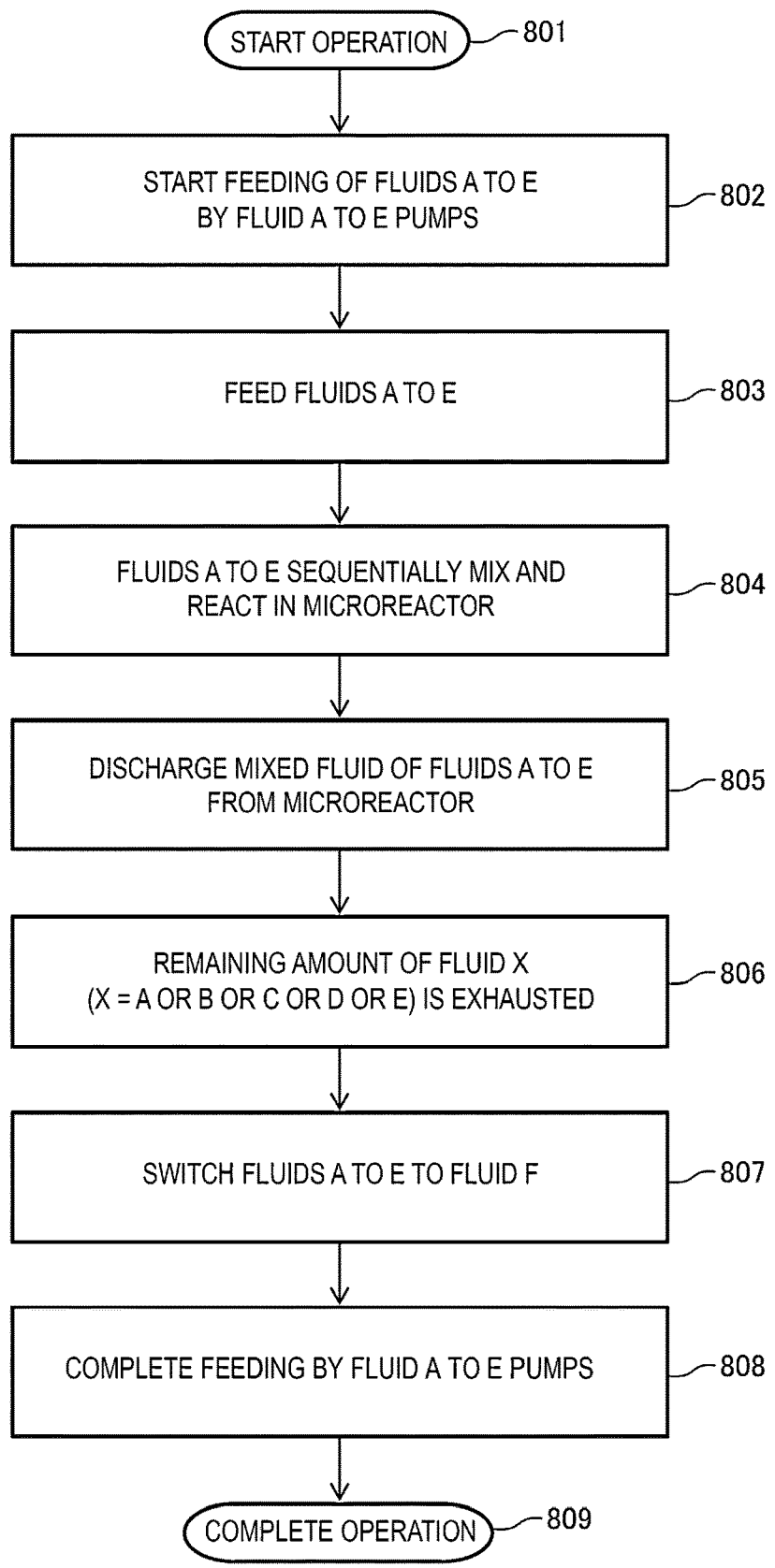
FIG. 8 is a flowchart showing an example of an operation method of the microreactor system.

FIG. 8 is a flowchart showing an example of the operation method of the microreactor system.

In the operation method shown in FIG. 8, in the microreactor system 3, after the feeding of the fluid A, the fluid B, the fluid C, the fluid D, and the fluid E is started, when it is measured that the fluid in any one of the fluid A container 701, the fluid B container 702, the fluid C container 703, the fluid D container 704, and the fluid E container 705 is exhausted, all the fluids of the fluid A, the fluid B, the fluid C, the fluid D, and the fluid E are switched to another fluid (the fluid F) different from the fluid A, the fluid B, the fluid C, the fluid D, the fluid E, and the mixed fluid.

In the operation method, the fluid A, the fluid B, the fluid C, the fluid D, the fluid E, and the fluid F are put into the fluid containers 701, 702, 703, 704, 705, and 706, respectively, and the operation of the system is started (step S801). Each of the switches 717, 718, 719, 720, and 721 is in a state in which the flow path from each of the fluid containers 701, 702, 703, 704, 705 in which the fluid of the raw material is prepared is open, and the flow path from the fluid F container 706 is closed.

Subsequently, the feeding of the fluid A, the fluid B, the fluid C, the fluid D, and the fluid E performed by the respective fluid pumps 707, 708, 709, 710, and 711 is started (step S802). By starting the fluid pumps 707, 708, 709, 710, and 711, the feeding of the fluid from the fluid containers 701, 702, 703, 704, and 705 to the microreactors 107a, 107b, 107c, and 107d is started.

After the fluid pumps 707, 708, 709, 710, and 711 are started, the fluid A, the fluid B, the fluid C, the fluid D, and the fluid E are fed to the junction inside the microreactors 107a, 107b, 107c, and 107d through the tube 109 (step S803). The fluid A, the fluid B, the fluid C, the fluid D, and the fluid E are sequentially introduced into the microreactors 107a, 107b, 107c, and 107d according to a mixing time and a reaction time.

When the feeding to the microreactors 107a, 107b, 107c, and 107d is performed, the fluid A, the fluid B, the fluid C, the fluid D, and the fluid E start mixing and reaction inside the microreactors 107a, 107b, 107c, and 107d (step S804). In each of the microreactors 107a, 107b, 107c, and 107d, the mixing and the reaction are sequentially started with the feeding of the fluids.

Next, the mixed fluid in which the fluids start mixing and reaction is discharged from the microreactors 107a, 107b, 107c, and 107d (step S805). The mixed fluid is sequentially discharged from the microreactors 107a, 107b, 107c, and 107d according to the mixing time and the reaction time. The discharged mixed fluid flows through the tube 109 while continuing the mixing or the reaction, and is finally collected in the collection container 108.

When the feeding of each fluid continues, since the remaining amount of the fluid in any one of the fluid A container 701, the fluid B container 702, the fluid C container 703, the fluid D container 704, and the fluid E container 705 is exhausted (step S806), such a state is detected by measuring the amount of the fluid. The amounts of the fluids inside the fluid containers 701, 702, 703, 704, and 705 are measured by the fluid sensors 712, 713, 714, 715, and 716 at appropriate time intervals during the operation of the system.

When it is measured that the fluid in any one of the containers is exhausted, all the fluids of the fluid A, the fluid B, the fluid C, the fluid D, and the fluid E are switched to another fluid different from the fluid A, the fluid B, the fluid C, the fluid D, and the fluid E (step S807). When the amount of the fluid in the container is below a threshold close to zero, it is determined that the fluid is exhausted, and fluid switching can be performed. Flow path switching performed by the switches 717, 718, 719, 720, and 721 is controlled based on measurement executed by the fluid sensors 712, 713, 714, 715, and 716.

After the fluids to be fed to the microreactors 107a, 107b, 107c, and 107d are switched, the feeding performed by the fluid pumps 707, 708, 709, 710, and 711 is completed at the stage in which the collection of a mixed fluid discharged from the fourth microreactor 107d at a final stage is completed (step S808). The feeding of each fluid is stopped by stopping a respective one of the fluid pumps 707, 708, 709, 710, and 711. Thereafter, the operation of the system is completed (step S809).

As described above, according to the operation method in which all the fluids whose remaining amounts are exhausted are switched to another fluid, even if the fluid in the container is exhausted during the operation of the pump, another fluid is fed toward the microreactor. By feeding another fluid, the fluid already fed toward the microreactor is pushed out to the discharge side. In addition, even if the gas in the container is suctioned, the gas can be prevented from flowing into the microreactor by switching the fluid to be fed.

Therefore, according to such an operation method, the fluid of the raw material can be efficiently used. At this time, since the remaining fluid at the side where the remaining amount is not exhausted is also switched to another fluid at the same time, for the remaining fluid at the side where the remaining amount is not exhausted as well, the fluid already fed toward the microreactor can be pushed out to the discharge side by another fluid. That is, in any of the systems as well, the fluid of the raw material can be removed from the inside of the microreactor or the inside of the pipe. Therefore, even if the fluid of the raw material is a toxic substance, a hazardous substance, or the like, it is possible to reduce the risk due to contact at the time of disposal and the costs of post-treatment for any of the systems as well.

In the microreactor system 3, it is also possible to use an operation method (see FIG. 3). In the operation method, after the feeding of the fluid A, the fluid B, the fluid C, the fluid D, and the fluid E is started, when it is measured that the fluid in any one of the fluid A container 701, the fluid B container 702, the fluid C container 703, the fluid D container 704, and the fluid E container 705 is exhausted, a part of the fluids whose remaining amounts are exhausted are switched to another fluid (the fluid F) different from the fluid A, the fluid B, the fluid C, the fluid D, and the fluid E, and the feeding of the fluid A, the fluid B, the fluid C, the fluid D, and the fluid E is completed without switching the remaining fluids in the containers whose remaining amounts are not exhausted to another fluid (the fluid F) different from the fluid A, the fluid B, the fluid C, the fluid D, and the fluid E.

In the microreactor system 3, it is also possible to use an operation method (see FIG. 5). In the operation method, after the feeding of the fluid A, the fluid B, the fluid C, the fluid D, and the fluid E is started, when it is measured that the fluid in any one of the fluid A container 701, the fluid B container 702, the fluid C container 703, the fluid D container 704, and the fluid E container 705 is exhausted, a part of the fluids whose remaining amounts are first exhausted are switched to another fluid (the fluid F) different from the fluid A, the fluid B, the fluid C, the fluid D, and the fluid E. After the part of the fluids whose remaining amounts are first exhausted are switched, when it is measured that the remaining fluids in the containers are exhausted, the remaining fluids whose remaining amounts are exhausted later are switched to another fluid (the fluid F) different from the fluid A, the fluid B, the fluid C, the fluid D, and the fluid E.

Fourth Embodiment

Next, a microreactor system according to a fourth embodiment of the invention will be described with reference to the drawings.

Figure 9:
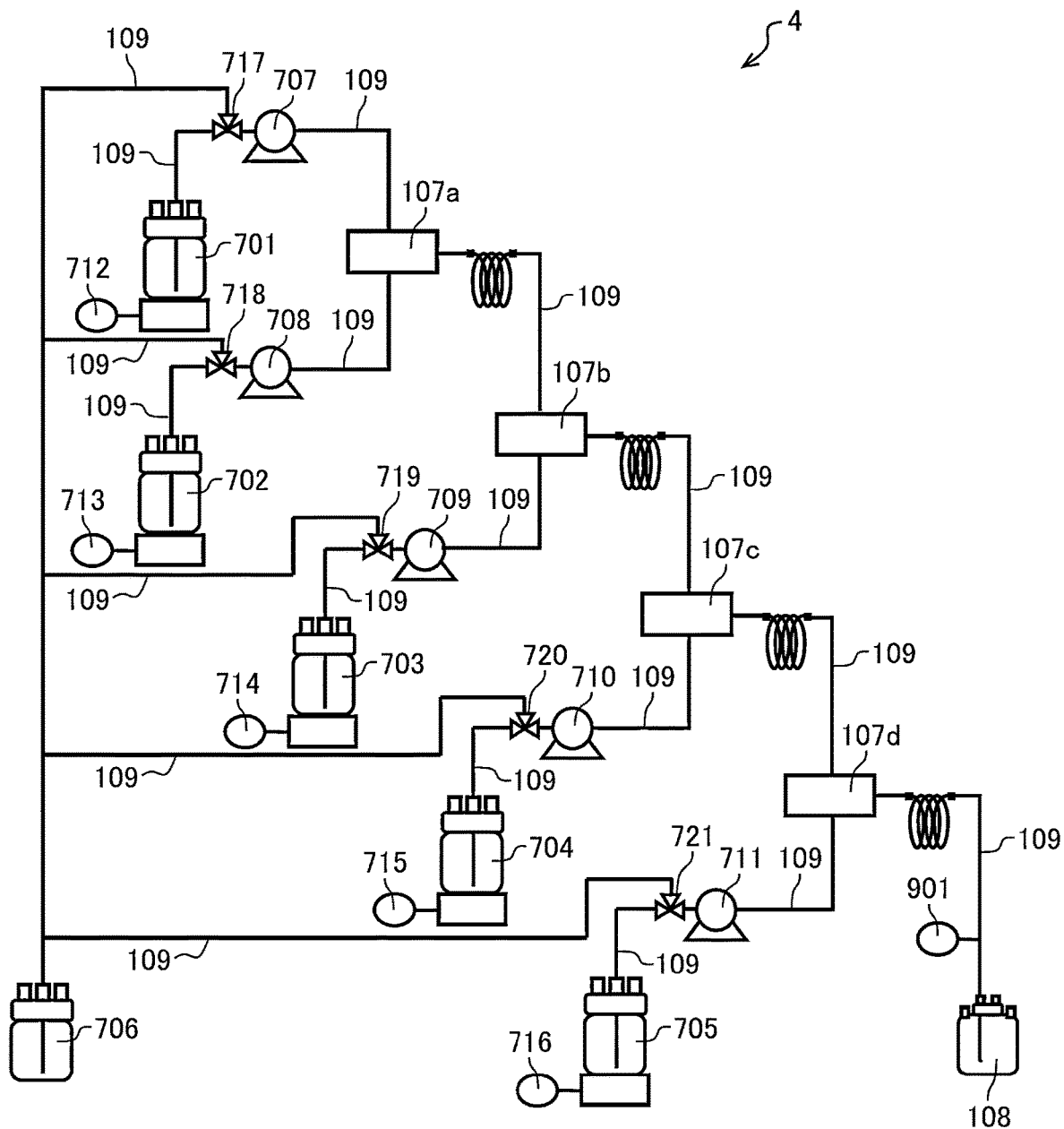
FIG. 9 is a schematic diagram of a microreactor system according to a fourth embodiment.

FIG. 9 is a schematic diagram of the microreactor system according to the fourth embodiment.

As shown in FIG. 9, similarly to the microreactor system 3 described above, a microreactor system 4 according to the fourth embodiment includes the plurality of microreactors 107a, 107b, 107c, and 107d, the collection container 108, the tube 109, the fluid containers 701, 702, 703, 704, 705, and 706, the fluid pumps 707, 708, 709, 710, and 711, and the fluid sensors 712, 713, 714, 715, and 716.

The microreactor system 4 is different from the microreactor system 3 described above in that a fluid detection sensor 901 is provided downstream of the fourth microreactor 107d in the final stage.

In the microreactor system 4, the tube 109 of a collection system to which the collection container 108 is connected is provided with the fluid detection sensor 901. The fluid detection sensor 901 is a sensor capable of measuring components in the mixed fluid to be finally collected.

As the fluid detection sensor 901, an appropriate detector is used according to the type of the fluid and target components. For example, it is possible to use a detector that detects an image, absorption, refraction, reflection, and scattering of light, electrical conduction, resistance, capacitance, and changes in pressure, temperature, ultrasonic waves, magnetism, and the like. The detector may be a device that executes detection of a specific component according to ultraviolet spectroscopy, infrared spectroscopy, Raman spectroscopy, or the like, or detection according to turbidity or the like.

The fluid detection sensor 901 can transmit a detection signal to a control device (not shown). The control device controls the stop of the operation of each of the fluid pumps 707, 708, 709, 710, and 711 by the input of the detection signal from the fluid detection sensor 901.

According to such a microreactor system 4, the fluid detection sensor 901 can accurately detect the end of the mixing and the reaction in the microreactor. In general, when a flow-type process is performed in a minute flow path such as a microreactor, the amount of the mixed fluid can be obtained based on the internal volume of the entire flow path. That is, an end time of the process can be determined based on the internal volume of the entire flow path and the flow rate of the mixed fluid.

However, in the case of such a determination method, product errors of the internal volume of the flow path of the microreactor and an inner diameter of the tube may have an influence. If the process is not completed at an appropriate time, a collection rate of a target substance decreases, or unreacted impurities are mixed. On the other hand, when the fluid detection sensor 901 detects the end of the mixing and the reaction, the target components in the mixed fluid can be efficiently collected with high purity.

Fifth Embodiment

Next, a microreactor system according to a fifth embodiment of the invention will be described with reference to the drawings.

Figure 10:
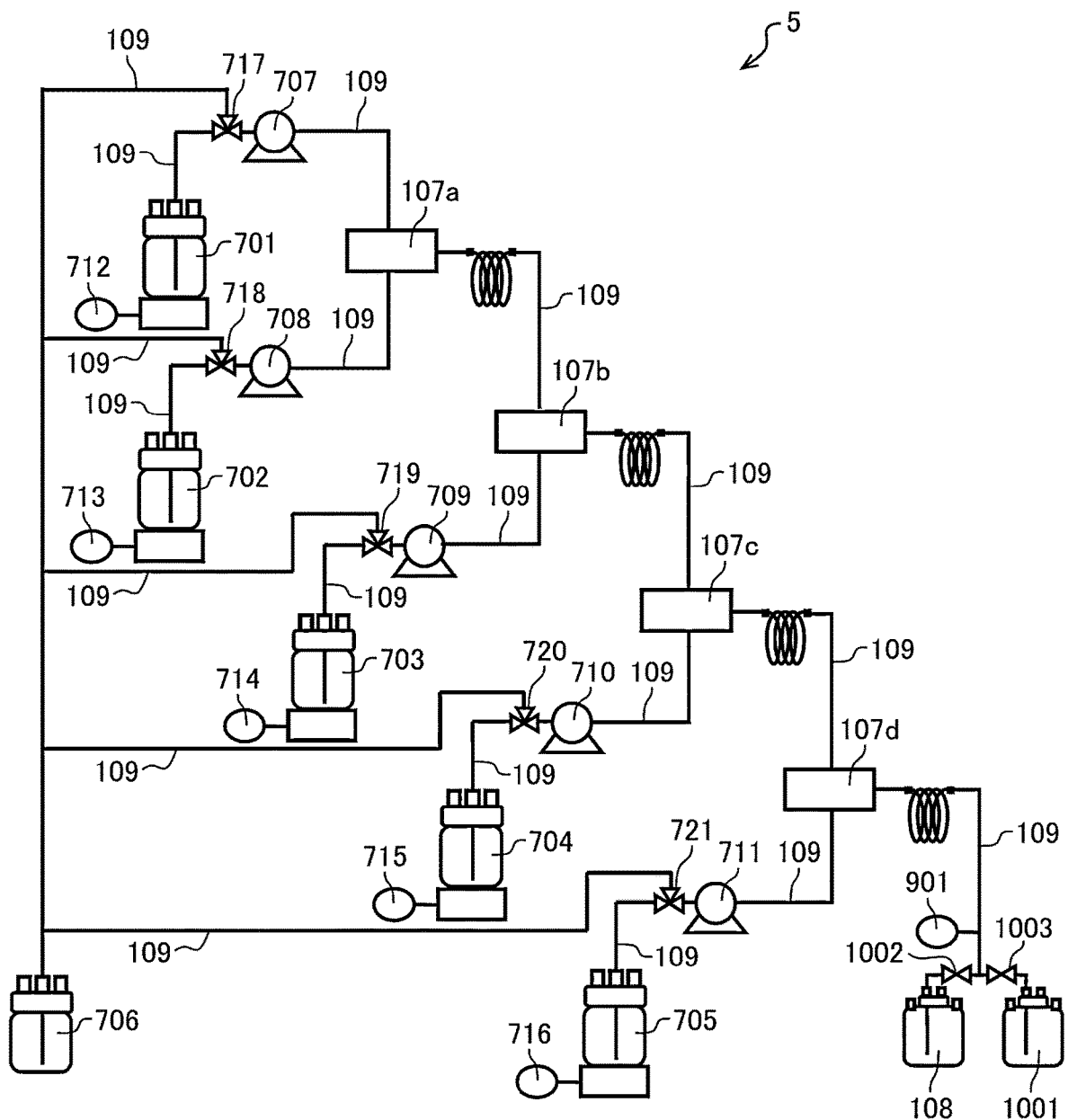
FIG. 10 is a schematic diagram of a microreactor system according to a fifth embodiment.

FIG. 10 is a schematic diagram of the microreactor system according to the fifth embodiment.

As shown in FIG. 10, similarly to the microreactor system 4 described above, a microreactor system 5 according to the fifth embodiment includes the plurality of microreactors 107a, 107b, 107c, and 107d, the collection container 108, the tube 109, the fluid containers 701, 702, 703, 704, 705, and 706, the fluid pumps 707, 708, 709, 710, and 711, the fluid sensors 712, 713, 714, 715, and 716, and the fluid detection sensor 901.

The microreactor system 5 is different from the microreactor system 4 described above in that a disposal container 1001 is connected downstream of the fourth microreactor 107d in the final stage in addition to the collection container 108, a collection valve 1002 is provided in the tube 109 branched into the collection container 108, and a disposal valve 1003 is provided in the tube 109 branched into the disposal container 1001.

The tube 109 is branched downstream of the fourth microreactor 107d, and the collection valve 1002 is provided in one of the branched flow paths. The collection container 108 is connected downstream of the collection valve 1002. The mixed fluid subjected to multi-stage mixing and reaction in the microreactors 107a, 107b, 107c, and 107d is collected in the collection container 108.

On the other hand, the disposal valve 1003 is provided in the other branched flow path. The disposal container 1001 is connected downstream of the disposal valve 1003. In the disposal container 1001, a fluid or the like that is not mixed at an appropriate mixing ratio in the microreactors 107a, 107b, 107c, and 107d is collected for disposal.

Figure 11:
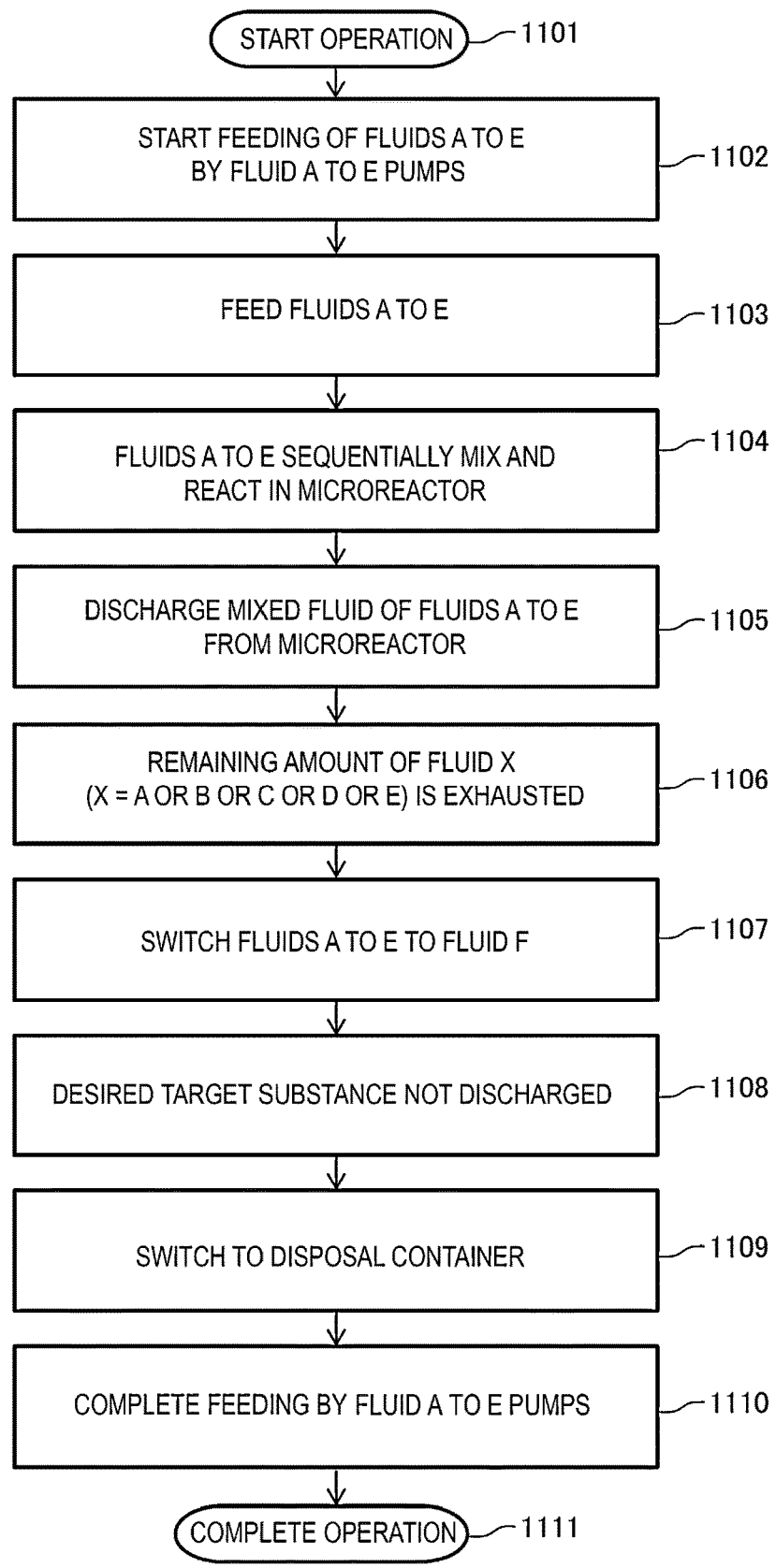
FIG. 11 is a flowchart showing an example of an operation method of the microreactor system.

FIG. 11 is a flowchart showing an example of the operation method of the microreactor system.

In the operation method shown in FIG. 11, in the microreactor system 5, a desired target substance generated by the multi-stage microreactors 107a, 107b, 107c, and 107d is collected in the collection container 108, and an unnecessary substance that is not mixed at an appropriate mixing ratio is collected in the disposal container 1001.

In the operation method, the fluid A, the fluid B, the fluid C, the fluid D, the fluid E, and the fluid F are put into the fluid containers 701, 702, 703, 704, 705, and 706, respectively, and the operation of the system is started (step S1101). The collection valve 1002 is in a state in which a flow path to the collection container 108 is open. The disposal valve 1003 is in a state in which a flow path to the disposal container 1001 is closed.

Subsequently, similarly to the operation method (see FIG. 8) described above, the start of the operation of the system (step S1101), the start of the feeding of each fluid (step S1102), the feeding to the junction of the microreactors 107a, 107b, 107c, and 107d (step S1103), the mixing and the reaction inside the microreactors 107a, 107b, 107c, and 107d (step S1104), the discharge of the mixed fluid from the microreactors 107a, 107b, 107c, and 107d (step S1105), the detection of exhausting of the remaining amount (step S1106), and the switching of the fluid (step S1107) are proceeded.

After the fluids to be fed toward the microreactors 107a, 107b, 107c, and 107d are switched, when the feeding of each fluid continues, since the desired target substance is not discharged from the fourth microreactor 107d at the final stage (step S1108), such a state is detected by measuring the components. An amount of a target component is measured by the fluid detection sensor 901 at appropriate time intervals during the operation of the system.

When it is measured that the desired target substance is not discharged, the container connected downstream of the fourth microreactor 107d in the final stage is switched from the collection container 108 to the disposal container 1001 (step S1109). The collection valve 1002 is controlled in a state in which the flow path to the collection container 108 is closed based on the measurement executed by the fluid detection sensor 901. The disposal valve 1003 is controlled in a state in which the flow path to the disposal container 1001 is opened based on the measurement executed by the fluid detection sensor 901.

After switching to the disposal container 1001, the feeding performed by each of the fluid pumps 707, 708, 709, 710, and 711 is completed (step S1110). The feeding of each fluid is stopped by stopping a respective one of the fluid pumps 707, 708, 709, 710, and 711. Each of the fluid pumps 707, 708, 709, 710, and 711 may be stopped when it is measured that each fluid of the raw material is not discharged based on the measurement executed by the fluid detection sensor 901. Thereafter, the operation of the system is completed (step S1111).

According to such a microreactor system 5, since the collection container 108 and the disposal container 1001 are switched downstream of the fourth microreactor 107d in the final stage, the target substance mixed at an appropriate mixing ratio can be efficiently collected with high purity, and the fluids of the raw materials such as the unnecessary substance, the toxic substance, and the hazardous substance that are not mixed at an appropriate mixing ratio can be safely collected as disposals. Since the risk due to contact at the time of disposal can be reduced, unnecessary fluids can be safely handled.

Sixth Embodiment

Next, a microreactor system according to a sixth embodiment of the invention will be described with reference to the drawings.

Figure 12:
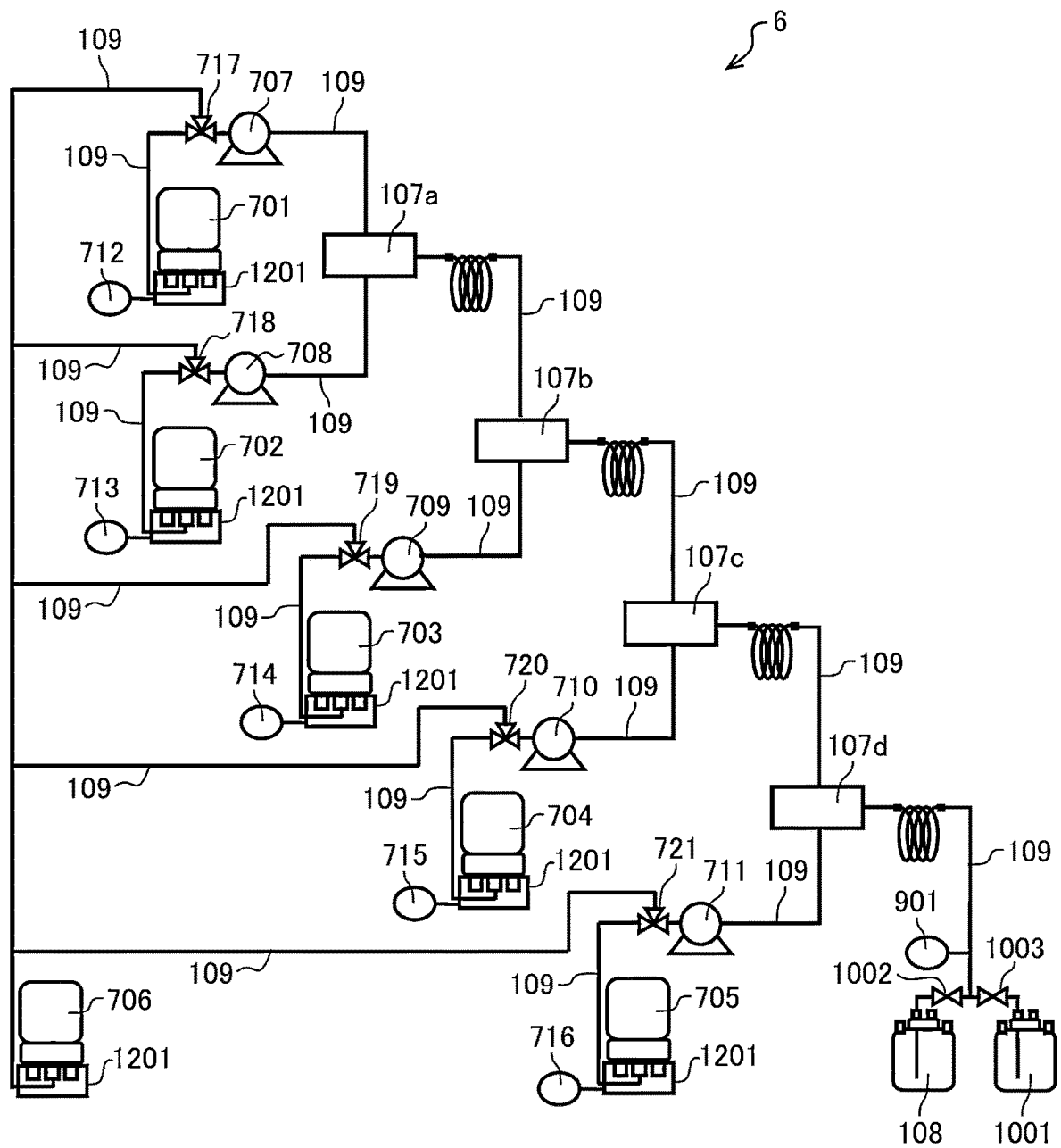
FIG. 12 is a schematic diagram of a microreactor system according to a sixth embodiment.

FIG. 12 is a schematic diagram of the microreactor system according to the sixth embodiment.

As shown in FIG. 12, similarly to the microreactor system 5 described above, a microreactor system 6 according to the sixth embodiment includes the plurality of microreactors 107a, 107b, 107c, and 107d, the collection container 108, the tube 109, the fluid containers 701, 702, 703, 704, 705, and 706, the fluid pumps 707, 708, 709, 710, and 711, the fluid sensors 712, 713, 714, 715, and 716, the fluid detection sensor 901, the disposal container 1001, the collection valve 1002, and the disposal valve 1003.

The microreactor system 6 is different from the microreactor system 5 described above in that each of the fluid containers 701, 702, 703, 704, 705, and 706 is supported by a rack 1201 having a shape in which a lower side is opened, and each of the fluid containers discharges a respective one of the fluids in a vertically downward direction.

The rack 1201 is provided in a shape in which the fluid container is supported above a ground contact surface of the rack 1201 itself and the lower side of the supported fluid container is opened. According to such a rack 1201, it is possible to connect a pipe to a discharge port and discharge the fluid in the container in a state in which the fluid container having the discharge port formed in a bottom portion is supported or in a state in which the fluid container having the discharge port formed in a ceiling portion is reversed and supported. Since the fluid including the fluid in the vicinity of the bottom portion of the container can be discharged by gravity, the utilization efficiency of the fluid of the raw material is less likely to decrease.

In the rack 1201, the support method of the fluid container is not particularly limited as long as the lower side of the fluid container is opened and the pipe such as the tube 109 can be connected to the discharge port of the fluid container. The fluid container may be supported by being placed on a table-shaped portion, a net-shaped portion, or the like, by being suspended from a bridge portion or the like, by being held on a frame portion or the like, or by being gripped and pinched by a support member.

Figure 13A:
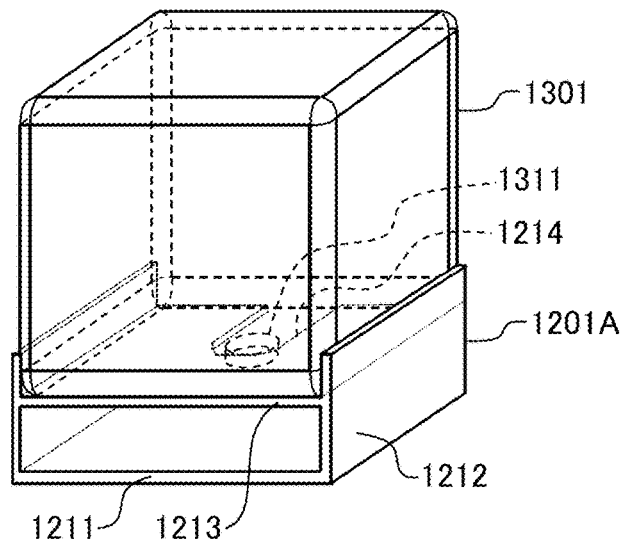
FIG. 13A is a diagram showing a method for placing a 3D bag on a table-shaped portion of a rack.
Figure 13B:
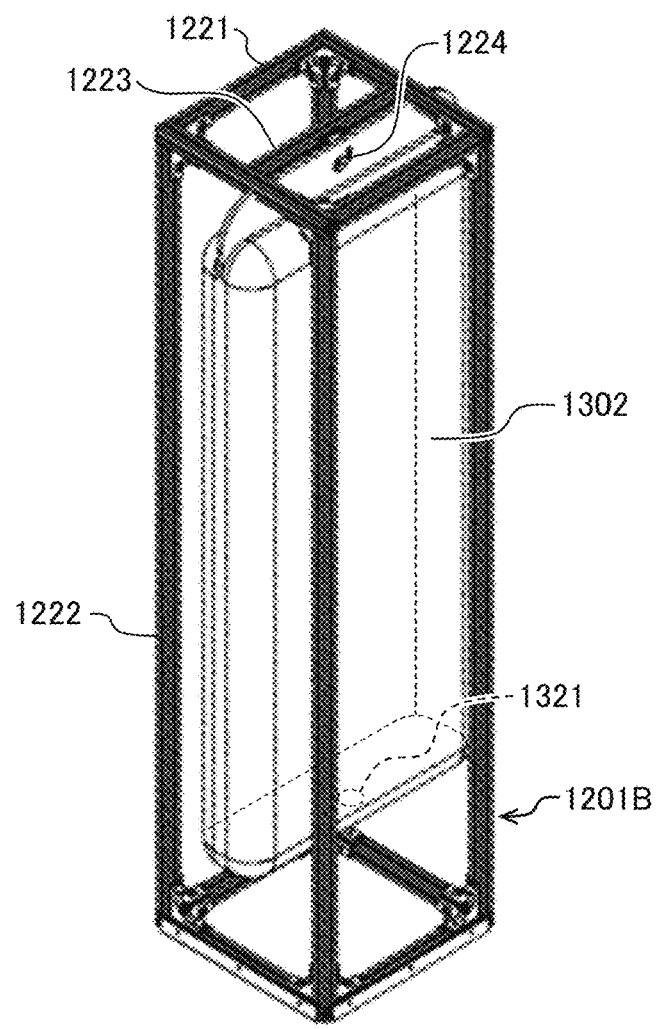
FIG. 13B is a diagram showing a method for suspending a 2D bag from the rack.
Figure 13C:
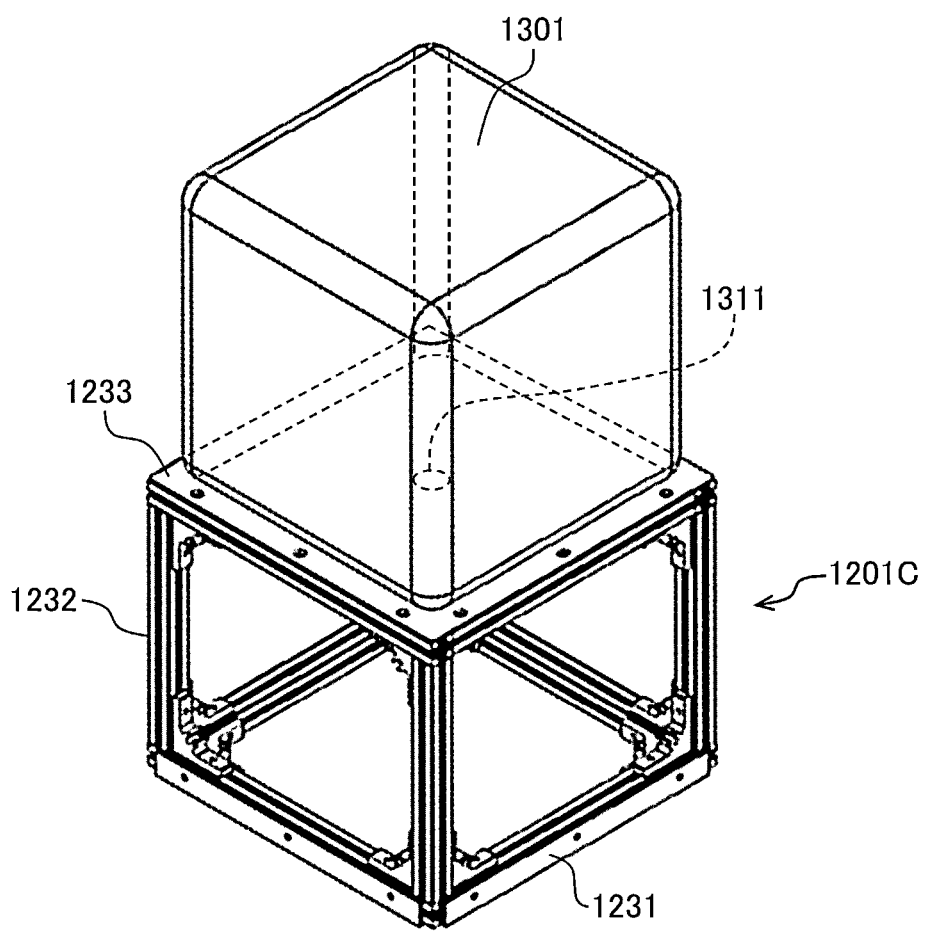
FIG. 13C is a diagram showing a method for holding a 3D bag on a frame portion of the rack.

FIGS. 13A, 13B, and 13C are diagrams showing a method for installing a fluid container. FIG. 13A is a diagram showing a method of placing a 3D bag on a table-shaped portion of a rack. FIG. 13B is a diagram showing a method of suspending a 2D bag from the rack. FIG. 13C is a diagram showing a method of holding a 3D bag on a frame portion of the rack.

In FIGS. 13A, 13B, and 13C, a reference numeral 1301 denotes an example of the fluid container, which is a 3D bag provided in a three-dimensional shape, and a reference numeral 1302 denotes an example of the fluid container, which is a 2D bag provided in a flat two-dimensional shape. A discharge portion 1311 is provided in the vicinity of the center of a bottom surface of the 3D bag 1301. Similarly, a discharge portion 1321 is provided in the vicinity of the center of a bottom surface of the 2D bag 1302. Pipes such as the tube 109 can be connected to the discharge portions 1311 and 1321.

As shown in FIG. 13A, the rack 1201 that supports the fluid container can be provided as a table-shaped rack 1201A including a table-shaped portion. The table-shaped rack 1201A includes a flat plate-shaped bottom plate portion 1211, a pair of left and right flat plate-shaped side plate portions 1212, and a flat plate-shaped top plate portion 1213.

The bottom plate portion 1211, the side plate portions 1212, and the top plate portion 1213 form a rectangular parallelepiped rack having an open front surface and an open rear surface. The top plate portion 1213 is formed with a notch 1214 from the vicinity of the center of one side to the vicinity of the center of a main surface. The notch 1214 has a width such that the pipe can be connected.

As shown in FIG. 13A, the 3D bag 1301 can be placed on the top plate portion 1213 of the table-shaped rack 1201A such that the discharge portion 1311 overlaps with the notch 1214. The top plate portion 1213 is supported by the side plate portions 1212 above the bottom plate portion 1211 to be grounded. Therefore, a lower side of the 3D bag 1301 is opened.

As shown in FIG. 13B, the rack 1201 that supports the fluid container may be provided as a suspension rack 1201B including a bridge portion. The suspension rack 1201B includes a frame member 1221 that forms a skeleton of a rectangular bottom portion and a rectangular ceiling portion, a column member 1222 that supports a vertex of the rectangular ceiling portion, a bridge member 1223 that cross-bridges the rectangular ceiling portion, and a hook 1224 that catches a support object.

The frame member 1221 and the column member 1222 are assembled in a rectangular parallelepiped shape to form a rack having a skeleton shape. Both ends of the bridge member 1223 are fixed to the frame member 1221, and form a bridge portion that crosses a ceiling surface. The hook 1224 is attached to the bridge member 1223 in a manner of being positioned in the vicinity of the center of the bridge portion crossing the ceiling surface.

As shown in FIG. 13B, the 2D bag 1302 provided with a locking portion for suspension can be suspended from the hook 1224 of the suspension rack 1201B. A length of the column member 1222 and a height of the hook 1224 are larger than those of the 2D bag 1302. Therefore, a lower side of the 2D bag 1302 is opened.

As shown in FIG. 13C, the rack 1201 that supports the fluid container may be provided as a frame platform rack 1201C including a frame portion. The frame platform rack 1201C includes a bottom member 1231 that forms a skeleton of a rectangular bottom portion, a column member 1232 that supports a vertex of a rectangular ceiling portion, and a frame member 1233 that forms a skeleton of the rectangular ceiling portion.

The bottom member 1231, the column member 1232, and the frame member 1233 are assembled into a rectangular parallelepiped shape to form a rack having a skeleton shape. In order to support an outer edge portion of the 3D bag 1301 from below, the frame member 1233 is provided such that an inner size of the skeleton of the rectangular ceiling portion is slightly smaller than a vertical width and a horizontal width of the 3D bag 1301.

As shown in FIG. 13C, the 3D bag 1301 can be held on the frame member 1233 of the frame platform rack 1201C such that the discharge portion 1311 faces downward and the periphery of the 3D bag 1301 is supported. The frame member 1233 is supported by the column member 1232 above the bottom member 1231 to be grounded. Therefore, the lower side of the 3D bag 1301 is opened.

When such a table-shaped rack 1201A, a suspension rack 1201B, or a frame platform rack 1201C is used, the fluid inside the fluid container can be discharged in the vertically downward direction. Therefore, in the microreactor system 5 or the like, the fluid of the raw material prepared in the fluid container can be used up to the vicinity of the bottom portion of the container without leaving a large amount of fluid in the fluid container. As compared with a case in which a pipe such as a tube is inserted from an upper portion of the fluid container and the fluid in the container is suctioned from the upper portion, the fluid in the container can be used more efficiently.

Any of the table-shaped rack 1201A, the suspension rack 1201B, and the frame platform rack 1201C can be mounted on an electronic balance together with the fluid containers such as the 3D bag 1301 and the 2D bag 1302. Since the racks have a skeleton shape or a hollow shape, the racks can be provided in a lightweight manner, and measurement errors due to the weight of the racks themselves can be easily reduced.

Although the embodiments and modifications of the invention have been described above, the invention is not limited to the embodiments described above, and various modifications can be made without departing from the spirit of the invention. For example, the invention is not necessarily limited to those including all the configurations included in the embodiments described above. A part of a configuration of an embodiment may be replaced with a configuration of another embodiment, may be added to another embodiment, or may be omitted.

For example, the microreactor system 1 described above may have a configuration in which a plurality of microreactors are connected in series. That is, in the microreactor system 3 described above, a fluid to be switched can be individually prepared for each fluid system. In the microreactor system 3 described above, the fluid to be switched may be individually prepared for a part of the fluid systems, and a common fluid to be switched may be prepared for the remaining fluid systems.

In the microreactor systems 1, 2, 3, 4, 5, and 6 described above, the number of stages of the microreactors connected in series may be any number of one or more. In the microreactor of each stage, two or more types of any fluids may be mixed.

The fluid detection sensor 901, the disposal container 1001, the collection valve 1002, the disposal valve 1003, and the rack 1201 described above may be provided in the microreactor systems 1 and 2 described above.

Installation positions of the fluid container, the collection container, the disposal container, the fluid pump, the fluid sensor, the switch, the rack, and the like may be changed or a part of the installation may be omitted as long as the functions thereof are not impaired. As the fluid prepared in the fluid container, a liquid may be used, a gas may be used, a liquid containing a solid may be used, a liquid containing a gas may be used, or a combination of a liquid and a gas may be used, and various fluids that can be treated as a fluid can be used.

The microreactor provided in each of the microreactor systems 1, 2, 3, 4, 5, and 6 may have an appropriate shape as long as the microreactor has a minute flow path that mixes at least two fluids. For example, the microreactor can be provided in an appropriate shape such as a Y shape or a T shape in a plan view, or can be provided in a shape in which the fluids form a multilayer flow and merge. A volume of the flow path from the inflow of the two fluids to the merging of the two fluids may be biased or may not be biased.

What is claimed is:

1. A microreactor system comprising:
a microreactor that has two inflow ports into which fluids are introduced and a flow path configured to merge the fluids, and that is configured to mix a first fluid introduced from one of the inflow ports and a second fluid introduced from another one of the inflow ports in the flow path;
a first container in which the first fluid is prepared;
a second container in which the second fluid is prepared;
a first pump configured to feed the first fluid toward the inflow port;
a second pump configured to feed the second fluid toward the inflow port;
a first measurement unit configured to measure an amount of the first fluid in the first container;
a second measurement unit configured to measure an amount of the second fluid in the second container; and
a switching unit configured to switch at least one of the first fluid and the second fluid to be fed to the microreactor to a fluid different from the first fluid and the second fluid.

2. The microreactor system according to claim 1, wherein after feeding of the first fluid and the second fluid is started, when it is measured that the fluid in one of the first and second containers is exhausted, the switching unit is configured to switch the exhausted fluid in the one of the first and second containers to a third fluid different from the first fluid and the second fluid, and the switching unit is configured to continue feeding of the first fluid and the second fluid is completed without switching the fluid in another one of the first and second containers to a fourth fluid different from the first fluid and the second fluid.

3. The microreactor system according to claim 1, wherein after feeding of the first fluid and the second fluid is started, when it is measured that the fluid in one of the first and second containers is exhausted, the switching unit is configured to switch the exhausted fluid in the one of the first and second containers to a third fluid different from the first fluid and the second fluid, and switch the fluid in another one of the first and second containers to a fourth fluid different from the first fluid and the second fluid.

4. The microreactor system according to claim 1, wherein after feeding of the first fluid and the second fluid is started, when it is measured that the fluid in one of the first and second containers is exhausted, the switching unit is configured to switch the exhausted fluid in the one of the first and second containers to a third fluid different from the first fluid and the second fluid, and after the fluid that is first exhausted is switched, when it is measured that the fluid in another one of the first and second containers is exhausted, the switching unit is configured to switch the exhausted fluid in the another one of the first and second containers to a fourth fluid different from the first fluid and the second fluid.

5. The microreactor system according to claim 1, further comprising:
a third container in which a third fluid different from the first fluid and the second fluid is prepared; and
a fourth container in which a fourth fluid different from the first fluid and the second fluid is prepared, wherein the switching unit includes
a first switching unit configured to switch the first fluid to be fed to the microreactor to the third fluid, and
a second switching unit configured to switch the second fluid to be fed to the microreactor to the fourth fluid.

6. The microreactor system according to claim 1, further comprising:
a third container in which a third fluid different from the first fluid and the second fluid is prepared, wherein the switching unit includes
a first switching unit configured to switch the first fluid to be fed to the microreactor to the third fluid, and
a second switching unit configured to switch the second fluid to be fed to the microreactor to the third fluid.

7. A microreactor system comprising:
a microreactor in a first stage that has two inflow ports into which fluids are introduced and a flow path configured to merge the fluids, and that is configured to mix a first-stage first fluid introduced from one of the inflow ports and a first-stage second fluid introduced from another one of the inflow ports in the flow path;

a plurality of microreactors in a second and subsequent stages disposed in series downstream of the microreactor in a first stage, each of the microreactors having two inflow ports into which fluids are introduced and a flow path configured to merge the fluids, and being configured to mix, in the flow path, a mixed fluid produced in the microreactor in a first stage and introduced from one of the inflow ports and fluids to be mixed introduced from another one of the inflow ports, respectively;

a first-stage first fluid container in which the first-stage first fluid is prepared;

a first-stage second fluid container in which the first-stage second fluid is prepared;

a plurality of containers for the fluids to be mixed that are provided for each of the microreactors in a second and subsequent stages and in which the fluids to be mixed are prepared;

a first-stage first fluid pump configured to feed the first-stage first fluid toward one of the inflow ports of the microreactor in a first stage;

a first-stage second fluid pump configured to feed the first-stage second fluid toward the other of the inflow ports of the microreactor in a first stage;

a plurality of pumps for the fluids to be mixed that are provided for each of the microreactors in a second and subsequent stages, and that are configured to feed the fluids to be mixed toward the other of the inflow ports of the microreactors in a second and subsequent stages;

a measurement unit for the first-stage first fluid that is configured to measure an amount of the first-stage first fluid in a first-stage first fluid container;

a measurement unit for the first-stage second fluid that is configured to measure an amount of the first-stage second fluid in a first-stage second fluid container;

a plurality of measurement units for the fluids to be mixed that are provided for each of the microreactors in a second and subsequent stages and that are configured to measure amounts of the fluids to be mixed in the containers for the fluids to be mixed;

a switching unit for the first-stage first fluid that is configured to switch the first-stage first fluid to be fed to the microreactor in a first stage to a fluid different from the first-stage first fluid, the first-stage second fluid, and the fluids to be mixed;

a switching unit for the first-stage second fluid that is configured to switch the first-stage second fluid to be fed to the microreactor in a first stage to a fluid different from the first-stage first fluid, the first-stage second fluid, and the fluids to be mixed; and a plurality of switching units for the fluids to be mixed that are provided for each of the microreactors in a second and subsequent stages and that are configured to switch the fluids to be mixed to be fed to the microreactors in a second and subsequent stages to fluids different from the first-stage first fluid, the first-stage second fluid, and the fluids to be mixed.

8. The microreactor system according to claim 1, further comprising:
   downstream of the microreactor, a component measurement unit configured to measure an amount of a component in a mixed fluid in the microreactor.

9. The microreactor system according to claim 1, wherein
   a collection container configured to collect a mixed fluid and a disposal container in which a fluid is disposed of are connected downstream of the microreactor.

10. The microreactor system according to claim 1, wherein
    one or more of the containers are supported by a rack in which a lower side of the container is opened, and discharge the fluid in a vertically downward direction.

11. The microreactor system according to claim 7, further comprising:
    downstream of the microreactor, a component measurement unit configured to measure an amount of a component in a mixed fluid in the microreactor.

12. The microreactor system according to claim 7, wherein
    a collection container configured to collect a mixed fluid and a disposal container in which a fluid is disposed of are connected downstream of the microreactor.

13. The microreactor system according to claim 7, wherein
    one or more of the containers are supported by a rack in which a lower side of the container is opened, and discharge the fluid in a vertically downward direction.

\* \* \* \* \*